United States Patent [19]

Cocke et al.

[11] 3,717,851

[45] Feb. 20, 1973

[54] PROCESSING OF COMPACTED DATA

[75] Inventors: John Cocke, Mount Kisco; Jacques H. Mommens, Briarcliff Manor; Josef Raviv, Ossining, all of N.Y.

[73] Assignee: International Business Machines Corporation, Armonk, N.Y.

[22] Filed: March 3, 1971

[21] Appl. No.: 120,572

[52] U.S. Cl. ..........................340/172.5, 340/347 DD

[51] Int. Cl. ..............................G06f 5/02, G06f 7/34

[58] Field of Search......340/172.5, 347 DD; 235/154

[56] References Cited

UNITED STATES PATENTS

| | | | |
|---|---|---|---|
| 3,350,695 | 10/1967 | Kaufman et al. | 340/172.5 |
| 3,490,690 | 1/1970 | Apple et al. | 235/154 |
| 3,051,940 | 8/1962 | Fleckenstein | 340/347 |
| 3,564,512 | 2/1971 | Osborne | 340/172.5 |
| 3,432,811 | 3/1969 | Rinaldi et al. | 340/172.5 |
| 3,394,350 | 7/1968 | Packard | 340/172.5 |
| 3,394,352 | 7/1968 | Wernikoff | 340/172.5 |
| 3,566,361 | 2/1971 | Lavertu et al. | 340/172.5 |
| 3,594,560 | 7/1971 | Stanley | 235/154 |
| 3,448,436 | 6/1969 | Machol, Jr. | 340/172.5 |
| 3,533,085 | 10/1970 | Murphy | 340/172.5 |
| 3,675,211 | 7/1972 | Raviv | 340/172.5 |
| 3,675,212 | 7/1972 | Raviv et al | 340/172.5 |

*Primary Examiner*—Paul J. Henon
*Assistant Examiner*—Jan E. Rhoads
*Attorney*—Hanifin & Jancin and Charles P. Boberg

[57] ABSTRACT

This data processing technique utilizes compacted data in the form of variable-length codes having length-representing prefix portions which themselves are variable-length encoded. The relatively small amount of storage needed when such a code format is used enables data to be conveniently encoded and handled as groups of characters rather than as single characters. The variable-length prefixes are decoded by a small, fast, search-only type of associative memory which furnishes a match-indicating signal as an address to another memory having conventional storage elements. The output of the latter may contain a base address in still another memory of conventional type and an indication of how many bits remain in the current variable-length code word. These remaining bits furnish a displacement value which, in combination with the base address, will locate the decoded fixed-length word or character group in the last memory unit. In those instances where the length of the variable-length codes would become excessively long (for the less frequently occurring character groups) the original fixed-length codes are employed, each being preceded by a common "COPY" code. A special decoding procedure is invoked by this copy code.

8 Claims, 14 Drawing Figures

INVENTORS
JOHN COCKE
JACQUES H. MOMMENS
JOSEF RAVIV

BY Charles P. Boberg
ATTORNEY

FIG. 6A UNIT I
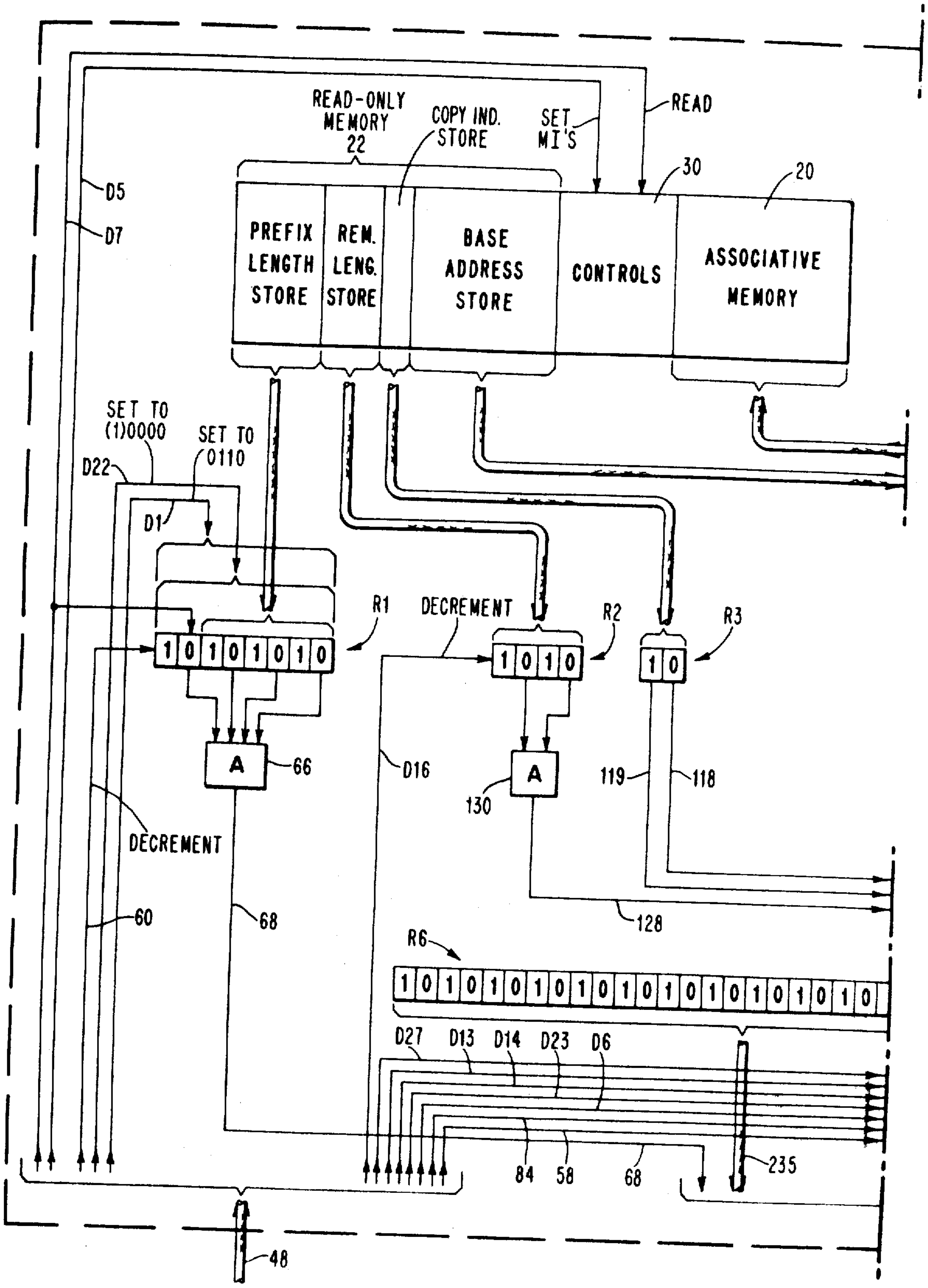

FIG. 6B UNIT I
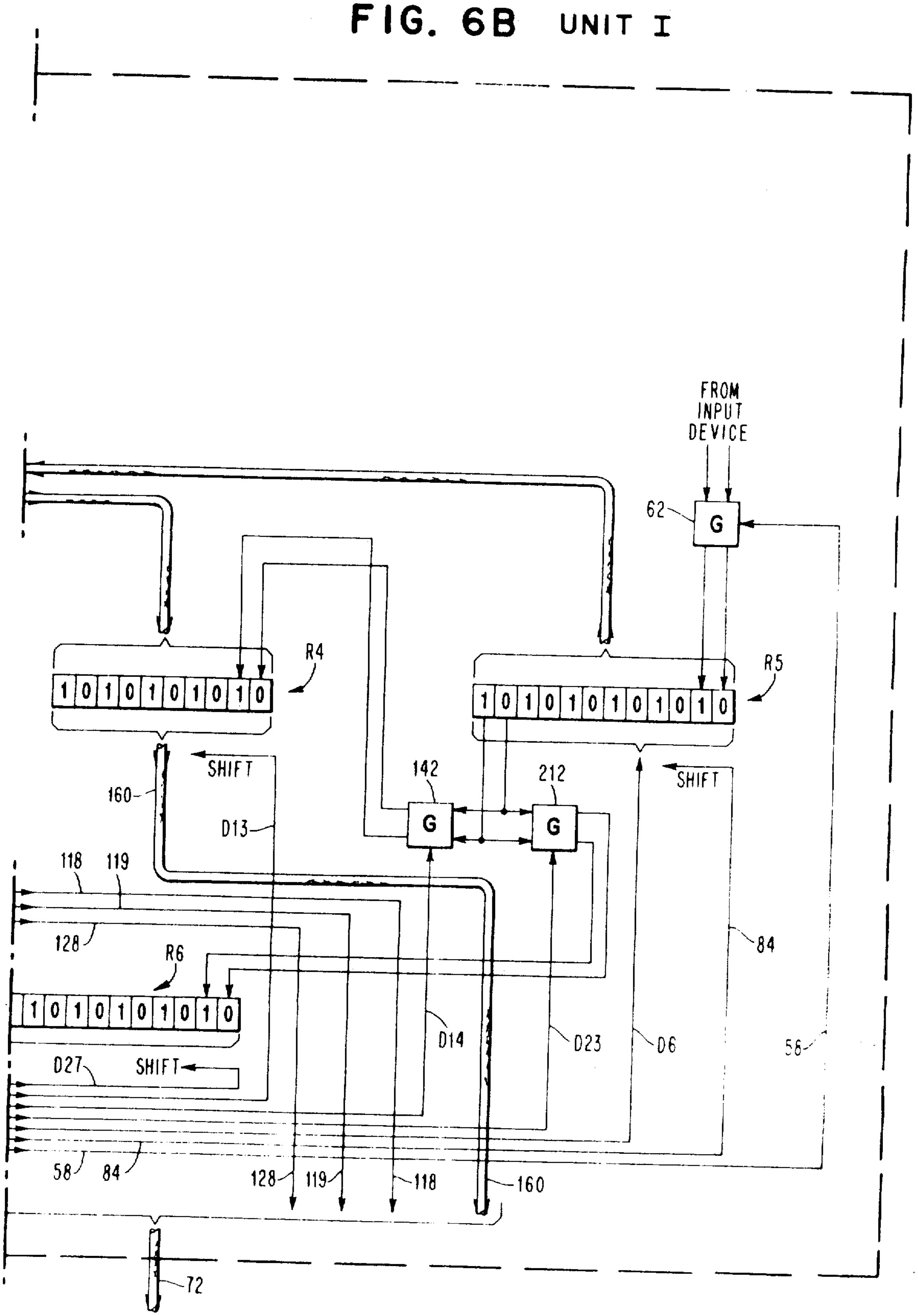

UNIT II

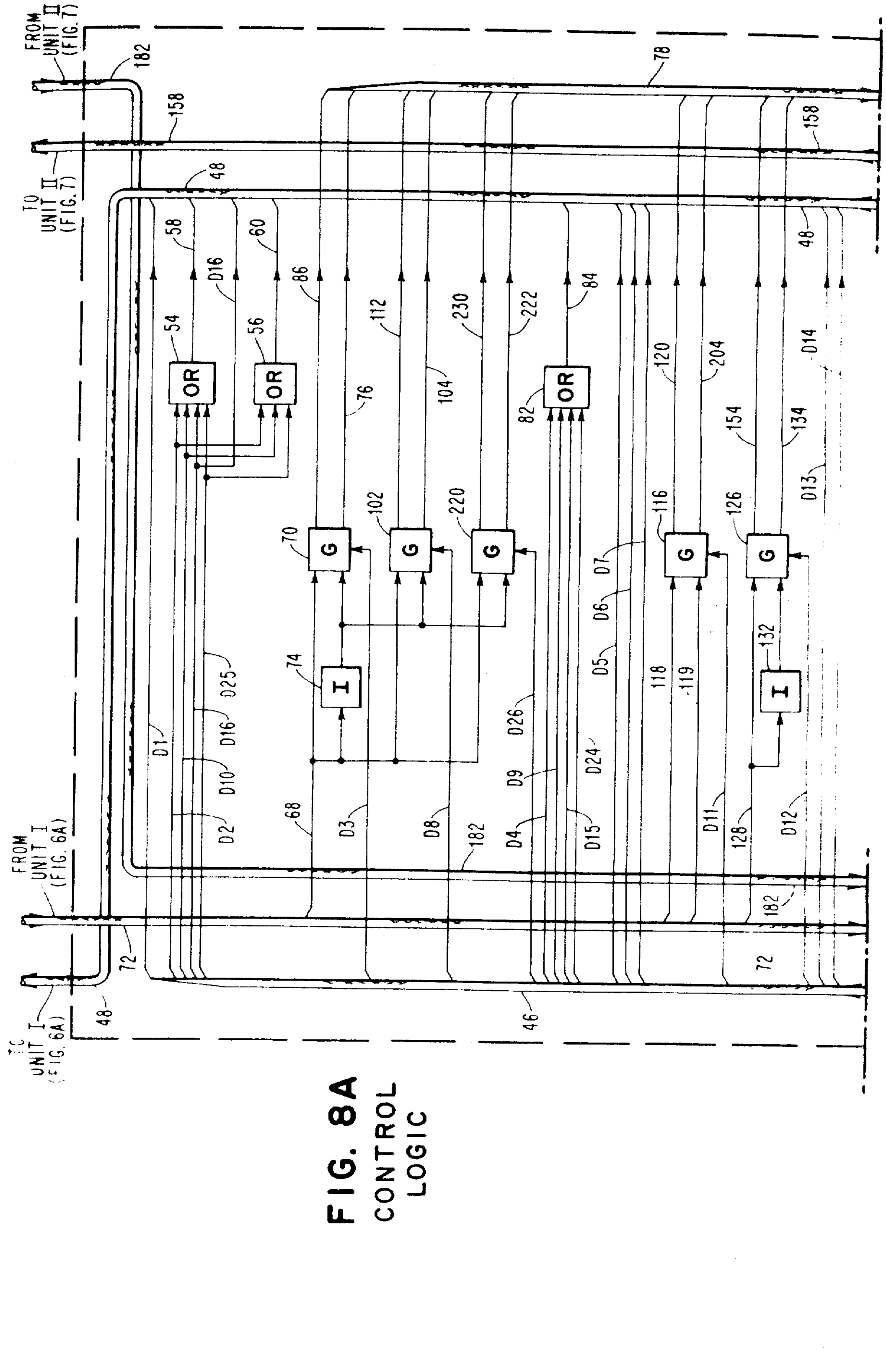
FIG. 8A CONTROL LOGIC

CONTROL LOGIC

PULSE GENERATOR

PULSE GENERATOR

PROCESSING OF COMPACTED DATA

BACKGROUND OF THE INVENTION

The use of variable-length coding to achieve data compaction in large data bases is well known. In accordance with this method of code conversion, the characters or other basic items of information to be processed are encoded into bit strings of varying length, with the shortest strings being assigned to the most frequently occurring items of data so that the bit strings respectively representing these items have an average length which is much less than that of bit strings representing such items in a conventional fixed-length code format. Thus, variable-length coding enables data to be transmitted and/or stored while in a compacted form thereby economizing the transmission time and storage facilities. When such data is to be used in a data processor, however, it must be converted back into a fixed-length code format. The means employed for effecting this code conversion should not have disadvantages which would significantly detract from the advantages gained by the data compaction process.

In any variable-length coding system, practical considerations will limit the maximum number of bits which can be handled as a single unit in the code conversion process. For example, if each processable unit of information can have a length of only 8 bits (i.e., 1 byte) in the fixed-length code format, then the system will be able to process information only one character at a time, since it takes one byte to represent a character in the conventional fixed-length code format. It is desirable, of course, that the information be processed in units which are as large as practicable. However, variable-length codes may have lengths which range from much shorter to much longer than their corresponding fixed-length codes, and the decoding apparatus must be able to handle the longest of the variable-length codes which may result from the encoding process. Size, cost and complexity of the decoding apparatus therefore become limiting factors. What is needed at the present time is a new variable-length coding concept that will enable data to be processed at a much greater rate through the necessary code conversion operation without greatly increasing the hardware requirements of such a system.

SUMMARY OF THE INVENTION

A prime object of the present invention is to increase the size of the basic processable unit of information which can be handled in a data compaction system of the variable-length coding type (for example, for 1 byte to 3 bytes), thereby greatly increasing the information handling rate, without at the same time incurring an unacceptable increase in cost and complexity of the various data storage and data handling facilities which are employed in the code conversion process. A further object is to reduce the average length of the variable-length codes which result from the encoding of fixed-length codes of a given size.

These objects are accomplished in the present instance by using a novel coding principle which enables the code conversion process to be carried out by an assemblage of hardware units of both conventional and unconventional types, with the unconventional portion of the system being relatively small and inexpensive, and the portion which uses the hardware of more conventional type being realizable within the environment of a normal computer installation.

To carry out the invention, the original data to be encoded is handled in relatively long bit strings or "-words," each containing, for example, three bytes or 24 bits. These words are encoded by a novel method whereby a certain number of the more commonly occurring words (for instance, 1023 of the possible $2^{24}$ words) are encoded into variable-length words in a manner such that each variable-length code word has a prefix portion which uniquely designates the length of that word. These prefixes themselves are of variable-length. Hence, the encoding process effectively combines two variable-length encoding operations, thereby keeping down the average size of the variable-length code words which are generated by the encoding process. All code words and all prefixes are of such nature that no code word is the beginning of a longer code word, and no prefix is the beginning of a longer prefix.

To decode such a variable-length code word, a small search-only type of associative memory (i.e., one which is required to generate only a match indicating signal as its output) is employed to decode the length prefixes only. Memory apparatus of a more conventional type responds to the decoded length prefix and to the remainder of the variable-length code word to retrieve the corresponding fixed-length code word. The length information indicates to the memory apparatus how many bits are in the remainder of the word to be decoded. Since the associative memory is not required to perform an information retrieval function, its size and cost are relatively modest.

For the less frequently occurring code words (i.e., the group of $2^{24} - 1023$ words) which are not treated as above, a different coding process is employed. This entire group of words is identified collectively by a "COPY" code prefix, and each word in its encoded form consists of the COPY code followed by the 24 bits of the original fixed-length code word. Hence, these COPY-coded words are of a fixed length which exceeds their original fixed length by the length of the COPY code. However, this total length is less than the lengths that many of the corresponding variable-length code words of lesser frequency would have, and since the COPY-coded words occur infrequently, they do not appreciably increase the overall average of code word lengths in the encoded data base. Decoding a word encoded in this particular fashion is a simple matter of discarding the COPY code prefix and using the rest of the code word without change as the fixed-length output code.

DESCRIPTION OF DRAWINGS

FIGS. 6A and 6B together constitute a circuit diagram of that portion of the decoder which is designated Unit I in the preceding views.

FIGS. 8A and 8B together constitute a circuit diagram of the control logic for the decoder.

GENERAL DESCRIPTION OF ENCODING AND DECODING PROCEDURES (FIGS. 1–4)

Figure 1:
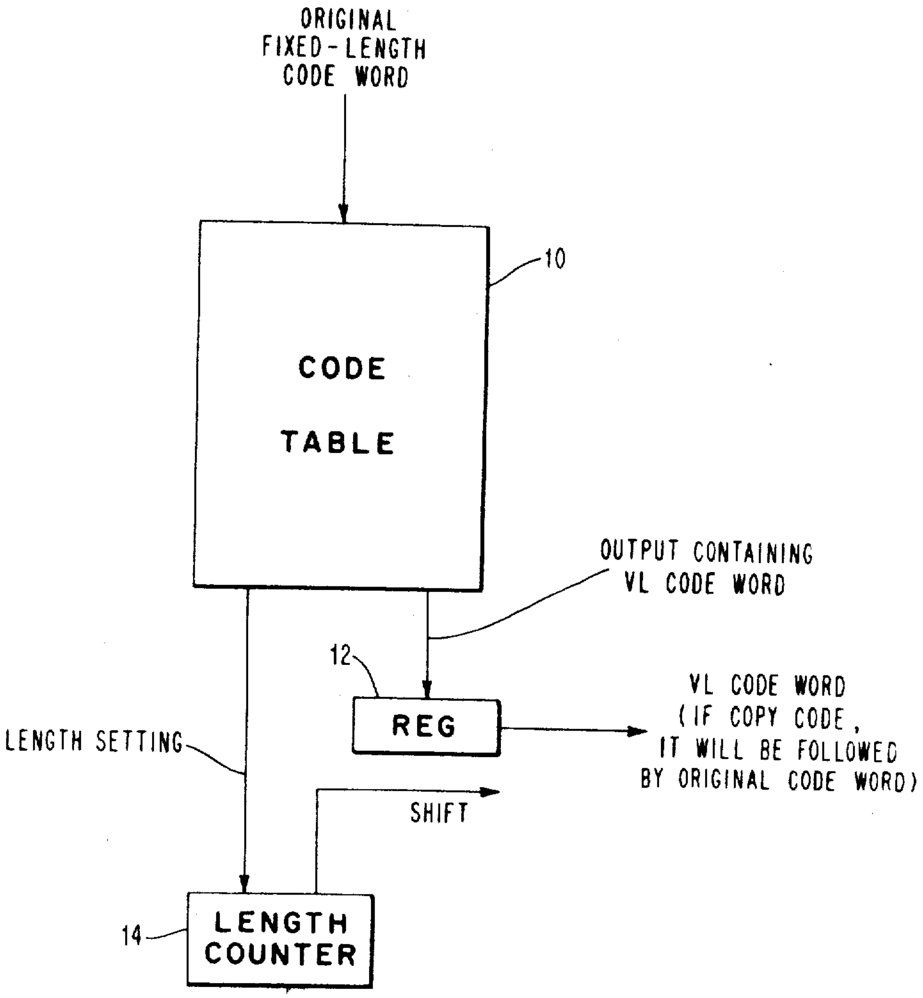
FIG. 1 is a simple diagrammatic showing of the manner in which the original fixed-length code words may be encoded into variable-length (VL) code words according to the principle of the invention.

Data compaction schemes which utilize the principle of this invention will be able to process data in large units or blocks (i.e., several bytes at a time) without requiring unduly complicated data processing facilities to perform the code conversion functions. As suggested hereinabove, as many as three or more bytes of conventionally coded data at a time can be encoded into the compacted, variable-length code format and thereafter decoded in such a way as to achieve a much higher data processing rate and a far higher degree of data compaction than is possible in a code conversion system which handles the data only one byte at a time.

For present illustrative purposes, attention will be given to the code conversion scheme schematically in FIGS. 1–4, which is designed to handle two characters of data at a time. Assuming that each character is represented by 1 byte (8 bits) of conventionally coded data, it is theoretically possible to have as many as $2^{16}$ different character pairs in the data base, this being the total number of different 2-byte configurations. In the present example, with the particular kind of data base under consideration, it is assumed that 21 of the available character pairs will occur often enough to justify the use of variable-length coding for converting such character pairs into a more compact encoded form. In the case of the remaining character pairs, their frequency of occurrence is so low that an alternative form of encoding is deemed to be more practical. In the latter case, the original 2-byte code representation of each such character pair is appended to a COPY code, which becomes the prefix of the resulting code word. The various conditions just described (i.e., length of input data unit and occurrence frequency of the character sets) are assumed for ease of explanation and not necessarily for the purpose of describing a commercially practicable system.

TABLE A, below, is a code table showing an illustrative coding for an assumed data base in which the pair of characters "IS" is assumed to be the character pair of most frequent occurrence, followed in order of frequency by "TH," "ɓɓ" (two blanks) and so on. The 21 most frequently occurring character pairs are represented by the variable-length (VL) codes in the second column of TABLE A. The lengths of these VL codes range from 2 bits to 8 bits in this example. Each VL code has a variable-length prefix portion which identifies the code length. That is to say, each prefix is unique to a certain length of code word. For instance, referring to the second, third and fourth columns of TABLE A, each VL code having "0" as its first bit has a length of 2 bits; hence the prefix "0" represents a code length of 2. As another example, any code word which begins with the combination of bits "110" has a length of 5 bits; hence the prefix "110" represents a code length of 5. In some instances more than one prefix may be assigned to the same code length. However, no same prefix is assigned to more than one code length. Thus, for example, the code length 7 may be represented by either of the prefixes "11101" and "111001," but neither of these two prefixes can represent any code length other than 7. One VL code word (100) has a prefix but no remainder in this example.

TABLE A

| Character Pair | VL Code Word | Code Length | Prefix | Remainder |
|---|---|---|---|---|
| IS | 00 | 2 | 0 | 0 |
| TH | 01 | 2 | 0 | 1 |
| ɓɓ | 100 | 3 | 100 | None |
| WE | 1011 | 4 | 101 | 1 |
| EA | 1010 | 4 | 101 | 0 |
| IT | 11000 | 5 | 110 | 00 |
| ,ɓ | 11001 | 5 | 110 | 01 |
| AN | 11010 | 5 | 110 | 10 |
| CH | 11011 | 5 | 110 | 11 |
| LY | 111101 | 6 | 11110 | 1 |
| ON | 111100 | 6 | 11110 | 0 |
| IN | 1110100 | 7 | 11101 | 00 |
| BR | 1110101 | 7 | 11101 | 01 |
| OU | 1110110 | 7 | 11101 | 10 |
| GE | 1110111 | 7 | 11101 | 11 |
| AU | 1110011 | 7 | 111001 | 1 |
| GI | 1110010 | 7 | 111001 | 0 |
| FO | 11100000 | 8 | 111000 | 00 |
| RT | 11100001 | 8 | 111000 | 01 |
| NG | 11100010 | 8 | 111000 | 10 |
| OF | 11100011 | 8 | 111000 | 11 |
| All Others | 11111 (Copy) | 5 | 11111 | Not applicable (see next paragraph) |

Note:

ɓ = blank

As TABLE A shows, the coded character pairs may have any of nine different variable-length prefixes (regarding the COPY code as a prefix), each prefix designating a particular code length and none other. The 5-bit COPY code 11111 is its own prefix and is considered to represent a code length of 5, for a reason which will become apparent presently. Actually, however, any code word containing the COPY code as its prefix will (in the present example) have a total of 21 bits, comprising the 5-bit COPY code followed by the original 16 bits (two bytes) which represented the character pair in its original fixed-length code format. The length of the COPY code may be determined by the frequency with which the members of its set of code words collectively occur; hence the COPY code may be handled as one of the variable-length prefixes and also as a variable-length code word, although in itself it has no counterpart among any of the fixed-length code words. For convenience, the various prefixes and the code lengths which they represent are listed in TABLE B.

TABLE B

| Prefix | Code Length |
|---|---|
| 0 | 2 |
| 100 | 3 |
| 101 | 4 |
| 110 | 5 |
| 11111 (COPY) | 5 |
| 11110 | 6 |
| 11101 | 7 |
| 111001 | 7 |
| 111000 | 8 |

The apparatus for encoding the character pairs will not be disclosed in detail herein because its particular construction is not relevant to the encoding principle, and its mode of operation will be obvious from similar functions performed by the decoding apparatus, a detailed description of which follows the present general description. Briefly, referring to FIG. 1 of the drawings, an encoding table such as TABLE A above is stored in a memory unit 10, which optionally may be of conventional type or an associative memory. The fixed-length (2-byte) code word representing the character pair to be encoded is used as an address to find in the code table 10 the corresponding variable-length code word or the COPY code, as the case may be. To minimize the storage space required, the COPY code may be stored at a single location which is addressed in common by all fixed-length code words that do not match any of the addresses at which the other variable-length code words are stored. Techniques for accomplishing this are well known. The addressed code word then is read out of the memory unit 10 to a data register 12.

The information stored in register 12 will contain not only the desired code word but usually some additional unwanted bits as well. Thus, for example, if the register 12 is designed to store the longest code word in the code table (here assumed to be 8 bits in length), and a 3-bit code word is read out of table 10, then only the first 3 bits stored in register 12 will be useful. Hence, some way must be provided to read the desired number of bits out of register 12 while excluding the others. This is accomplished by a register shifting means which operates under the control of a length counter 14. Whenever a code word is read out of memory 10 to the register 12, a length setting (third column of TABLE A above) is entered into the length counter 14 to denote the number of bits which must be shifted out of register 12 to form the desired output code word. In the case of a COPY code, 5 bits will be shifted out of register 12, but when the output code is transmitted to a storage unit or decoding device, the 16 bits of the original fixed-length input code are appended to the 5-bit COPY code to form the final output ccde, which is 21 bits in length.

Figure 2:
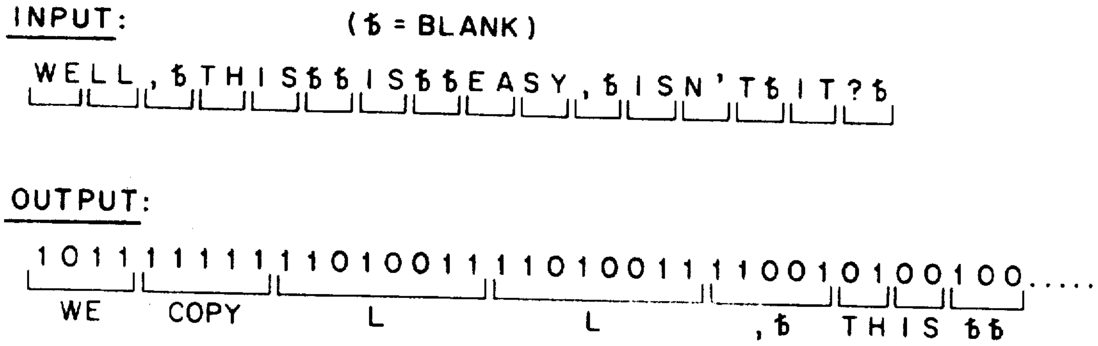
FIG. 2 is a representation of this encoding process as applied to a specific example.

A simple example of coding is illustrated in FIG. 2, wherein the symbol ƀ represents a single blank space. The input text to be coded is the sentence:

WELL,ƀTHISƀƀISƀƀEASY,ƀISN'TƀIT?ƀ

This text is encoded two characters at a time. By referring to TABLE A, it is seen that the first character pair WE yields the 4-bit code word 1011, in which 101 is the length-indicating prefix. The next character pair LL is assumed to be not among the 21 most frequently occurring character pairs in the data base under consideration. Hence, its encoding will involve, first, the generation of the 5-bit COPY code 11111, then, appending to this COPY code the 16 bits which represented LL in the original fixed-length code format. In other words, the 8-bit code 11010011, which normally represents L in conventional fixed-length code notation, is generated twice in succession, following the generation of the COPY code, giving the 21-bit representation of LL shown in FIG. 2. In other data bases it may happen that LL is a more frequently occurring character pair and therefore can be assigned a variable-length code.

The encoding process continues as indicated in FIG. 2 according to the coding scheme of TABLE A, finally yielding a bit stream which represents the input text in its variable-length encoded format. The data is now in a compacted form which is very useful for economical transmission and/or long-term storage. Before it can be used in a data processor, however, the data thus represented must be decoded, i.e., converted back into its original fixed-length code format. A decoding apparatus for accomplishing this in accordance with the invention is shown generally in FIG. 3 and in somewhat more detailed form in FIG. 4.

Figure 3:
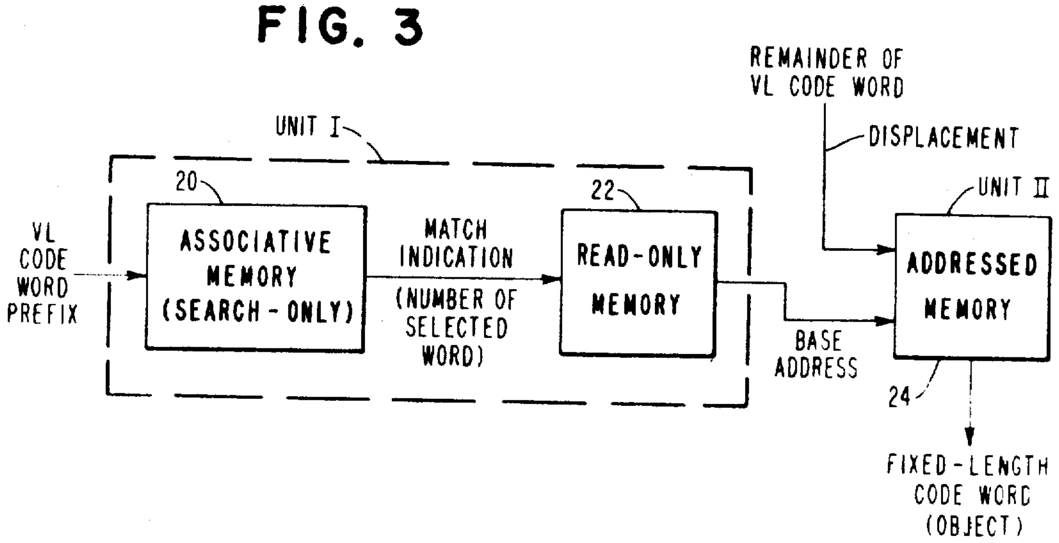
FIG. 3 is a block diagram indicating some of the components of a decoder which operates in accordance with the invention.

Referring first to FIG. 3 for a very general illustration of the decoding process, each variable-length (VL) code word prefix is used as an argument to search for a matching word in an associative memory 20, preferably of the three-state type as described hereinafter. Since the length-indicating prefixes of the variable-length code words are themselves of variable lengths, the correct registry of each successive prefix in a position where it can serve as a search argument is one of the problems which has to be handled by the invention, and the manner in which this is accomplished will be explained presently. The associative memory 20 is of the search-only type, meaning that the only output information which it is required to generate is a match-indication signal in the row containing the matching word. This signal merely designates the number or address of a particular word stored in a companion read-only memory 22, wherein the storage elements are of conventional type. The information which is needed in the decoding process is read out of the memory 22. The two memories 20 and 22 together constitute a first stage of the decoding processor, herein designated unit I.

Among the items of information read from memory 22 (which will be described in more detail hereinafter) is a selected base address which (with some modification) is used in an addressed memory 24 of conventional type constituting the second stage of the decoding processor, also designated unit II. The selection of the base address is determined by the VL code word prefix that was used as an input argument to memory 20. The remainder, if any, of this VL code word is utilized as another input to unit II for indicating a displacement to be used in conjunction with the selected base address to develop a final address in memory 24 at which is stored the fixed-length code word or "object" corresponding to the input VL code word.

The foregoing description briefly summarizes the decoding process. The associative memory 20 is required to store only the prefix portions of a relatively small number of VL code words, representing the most frequently used character combinations, plus a COPY code which is the common prefix of all other input code words, and all that it does is point to a location in memory 22 where the information required for performing the remainder of the decoding operation may be found. Thus, only a small percentage of the storage elements involved in the decoding process need be associative memory elements, and the size of associative memory 20 therefore can be quite small in comparison with that of the other memories 22 and 24.

Figure 4:
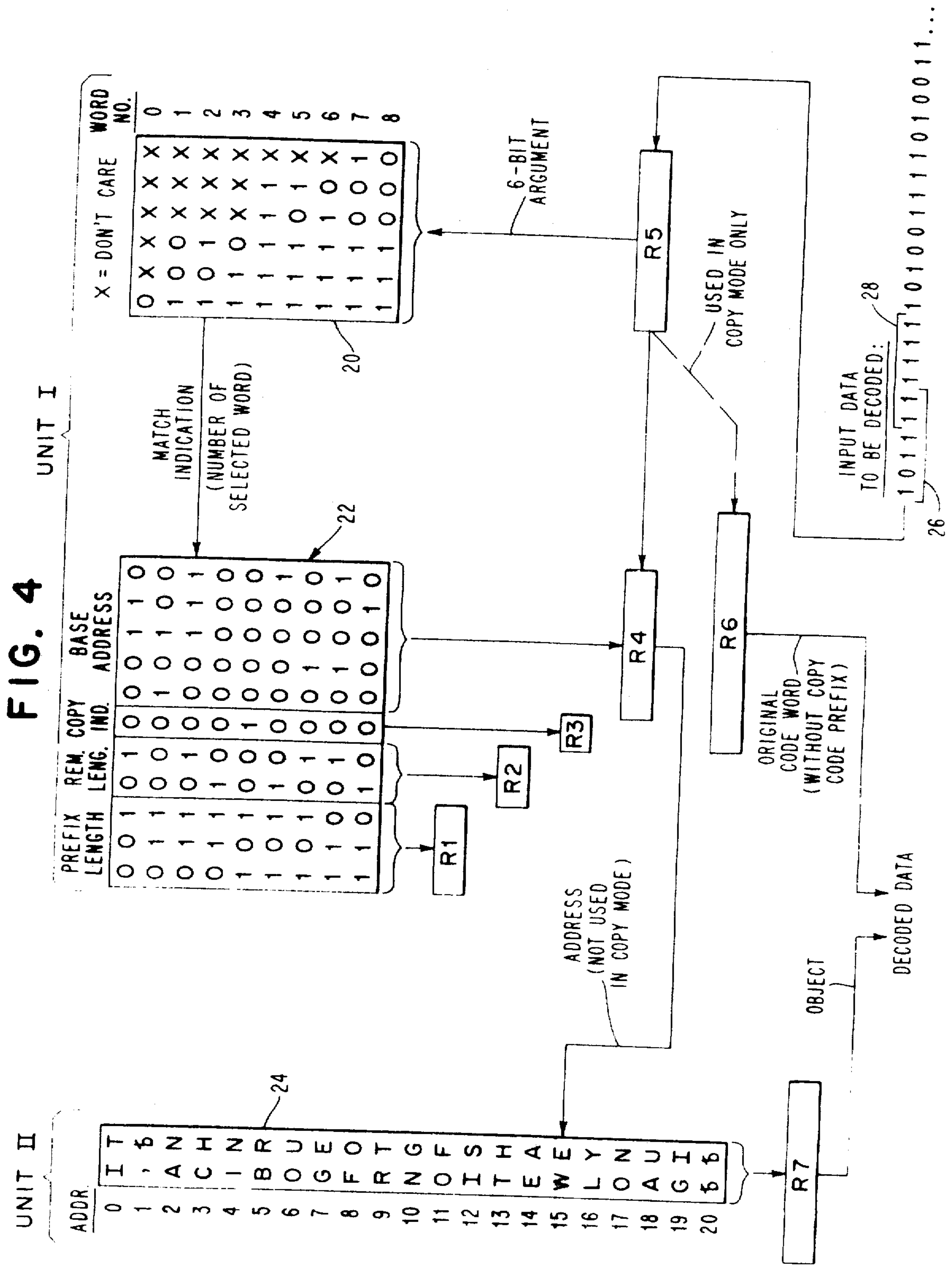
FIG. 4 is a more specific illustration of the decoding scheme shown generally in FIG. 3.

FIG. 4 shows in a little greater detail the principal steps of the decoding process. For convenience of illustration, the components are shown as being arranged differently in FIG. 4 than they are in the other views. The input bit stream, containing the bits of the successive input code words, enters the argument register R5 of the associative memory 20. It is assumed in the present example that the longest prefix contains 6 bits (as shown by Table B above). Therefore, argument register R5 has a capacity for storing 6 bits. This affords a 6-bit "window" for viewing the incoming bit stream, as indicated by the bracket numbered 26 in the lower right corner of FIG. 4. Memory 20 searches on the 6-bit argument stored in R5.

The associative memory 20 is adapted to convert the argument into a match indication signal on one of a plurality of output lines, there being one such line for each available prefix. Each of these prefixes is stored in a row or "word" of memory 20. The storage elements of memory 20 are three-state devices which can be set to a binary ZERO, binary ONE or "don't care" state (indicated by X in FIG. 4). The construction of such storage devices is well known. Each three-state storage device may store one of the bits in a prefix. Thus, cells which are not intended to store bits (in words containing short prefixes) are set to their "don't care" state, effectively masking such cells from interrogation.

Assuming that the first six bits of the input data stream (denoted by the window 26, FIG. 4) have entered the argument register R5, association is performed on this set of 6 bits, which in the present instance is assumed to be 101111. The only word in associative memory 20 which matches this particular bit combination is word No. 2, which contains the prefix 101. Hence, the output of memory 20 under these circumstances will be a match indication on the output line corresponding to word No. 2. As indicated in FIG. 4, this match indication points to a word in memory 22 having a correspondingly numbered address. It will be noted that of the six bits entered into argument register R5, only the first three bits are effective in this instance. Since all of the variable-length prefixes are themselves prefix-free (in the sense that no prefix may constitute the beginning of a longer prefix) there will be one and only one match for each argument which addresses the associative memory 20.

A COPY code (11111) is handled the same as any other prefix. Thus, a COPY code stored in the left-hand five cells of argument register R5 will match with word No. 4 in memory 20, thereby generating a match indication signal on the output line for this word. An instance of this kind will be considered presently.

Referring again to the conditions as depicted in FIG. 4, wherein the prefix 101XXX (word No. 2) has been selected, the match indication signal addresses the correspondingly numbered word in read-only memory 22. Each word stored in memory 22 has four fields. The first field, containing three bits, represents the length of the prefix. The second field, containing 2 bits, represents the length of the remainder of the current variable-length (VL) code, after the prefix has been deducted therefrom. Inasmuch as each prefix is unique to a particular code length, the prefix length and the remainder length are known from the prefix itself, and such information therefore can be pre-stored in the memory 22. The third field, containing one bit, is set to a 1 or 0 state according to whether the prefix is or is not a COPY code. In the present example, only one of the copy indicators (namely, the one for word No. 4) is set to 1, those for the other words being set to 0. The fourth field of memory 22 contains the various base addresses which, as explained above in connection with FIG. 3, normally are used for locating the final decoded output word in the unit II memory 24.

When the match indication signal generated by memory 20 is applied to memory 22, the items of information stored in the various fields of the addressed word in memory 22 are read out and entered respectively into the data registers R1, R2, R3 and R4. The prefix length stored in register R1 is utilized (in the manner explained hereinafter) to shift the contents of the argument register R5 by the number of bits contained in the VL code prefix that was just decoded. Thus, in the present example the three bits 101 in the prefix are shifted out of the register R5 and are now discarded. The base address presently stored in register R4 now must be modified by a certain displacement value in order to find the correct final address in memory 24. This address modification is accomplished in the following manner:

The number of bits remaining in the current VL code is indicated by the remainder length (01) stored in register R2. This information is utilized to shift the contents of register R5 by the number of bits in the remainder, which is 1 bit in the present example. The 1 bit which is read out of R5 in this instance, is entered into the low-order end of register R4, and the contents of register R4 concurrently are shifted to the left by one bit position. The effect of this operation is the same as though the initial base address 00111 had been converted into a new base address 01110, to which then was added a digit 1 to create a new address 01111. This resulting address of 01111, or 15 in decimal notation, is registered in R4 as the final address for locating the decoded character pair in memory 24. This character pair, WE, then is entered into register R7, from which it is read out as the decoded object.

As a result of the various register shifting operations described above, the first four bits, 1011, of the original 6-bit combination stored in argument register R5 (i.e., the 6 bits 101111 bracketed by the first window 26, FIG. 4) will have been shifted out of register R5. The original 6-bit combination thus has been replaced by a new 6-bit combination (denoted by the second window 28, FIG. 4) in which the first two bits are the same as the last two bits of the preceding combination. This is indicated by the 2-bit partial overlapping of windows 26 and 28 in FIG. 4. These relationships, of course, are subject to variation as changes in the prefix and remainder lengths occur during the course of the decoding process.

In the example presently under consideration, the second set of 6 bits (111111) which now is stored in argument register R5 includes as its prefix the 5-bit COPY code, 11111. The search operation in memory 20 proceeds as before, except that in this instance word No. 4 (11111X) is the matching word. When the items of information stored in word No. 4 of read-only memory 22 are read out and entered into data registers R1, R2, R3 and R4, the register R3 this time will store a COPY indication bit of 1, rather than 0 as before. This alters the resulting sequence of operation, as will be explained shortly.

The information in register R1 is employed as usual to shift the contents of argument register R5 leftward by the number of bits in the prefix (5 bits in the present instance), causing these prefix bits to be shifted out of register R5 and discarded. Thus, the 5 COPY code bits 11111 have exited from register R5. At the same time, 5 new bits from the input bit stream enter the register R5 from its right or low-order end. The 6 bits now standing in register R5 are, in the present instance, the first 6 bits of a 16-bit string constituting the fixed-length code word representing the current character pair, LL. The presence of a 1 in register R3 brings about a modified operation wherein 16 bits of data are shifted into register R5, causing a corresponding number of bits to be shifted out of register R5 and into a 16-bit register R6. Effectively, then, the 16 bits which followed the COPY code in the bit stream have been routed to register R6. Since this bit combination is identical with the original fixed-length code for the character pair under consideration, it may be read out directly from register R6 as the decoded output word.

To recapitulate, if no COPY code is present, the decoding operation involves the routing of information from the input bit stream through registers R5 and R4 and the looking up of the decoded output in memory 24. All fields of memory 22 are utilized for effecting this operation. If a COPY code is present, information is routed from the bit stream through register R5 to register R6, from which the decoded output is taken directly. It will be noted that in this latter type of operation, only the prefix length and COPY indicator fields of memory 22 are effectively utilized. The information in the remainder length and base address fields is irrelevant under these circumstances.

The memories 22 and 24, FIG. 4, are the kind of high-speed storage facilities usually available in conventional data processors, and the registers R1 to R4, R6 and R7 may be parts of the standard register circuitry associated with such memory facilities. Associative memory 20 has an argument register R5 but requires no data register, since its output directly addresses the read-only memory 22. All of the units referred to in FIG. 4, as well as other parts of the data processor that operate in conjunction therewith, are described at greater length in the following detailed description.

This concludes the general description of operation, which sets forth the salient features of the encoding and decoding operations involved in carrying out the invention. An understanding of these general principles will be assumed in the more detailed description which follows.

DETAILED DESCRIPTION OF PREFERRED EMBODIMENT (FIGS. 5–11)

Figure 5:
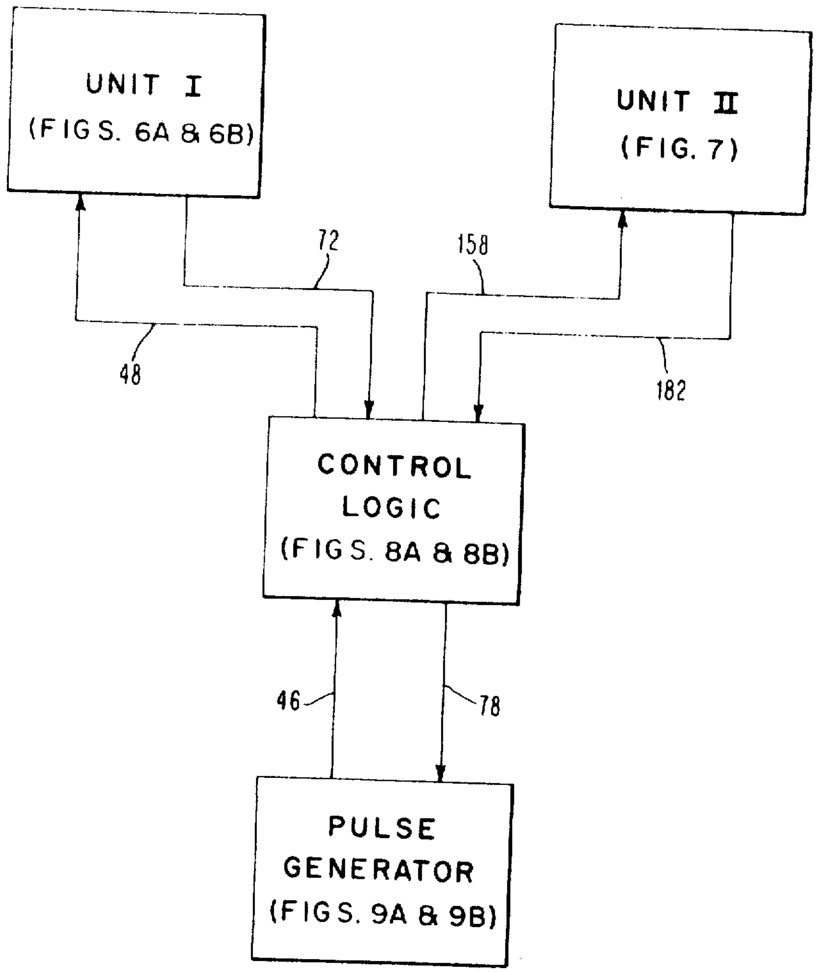
FIG. 5 is a block diagram of the decoder as a whole showing how its various components are interrelated.
Figure 7:
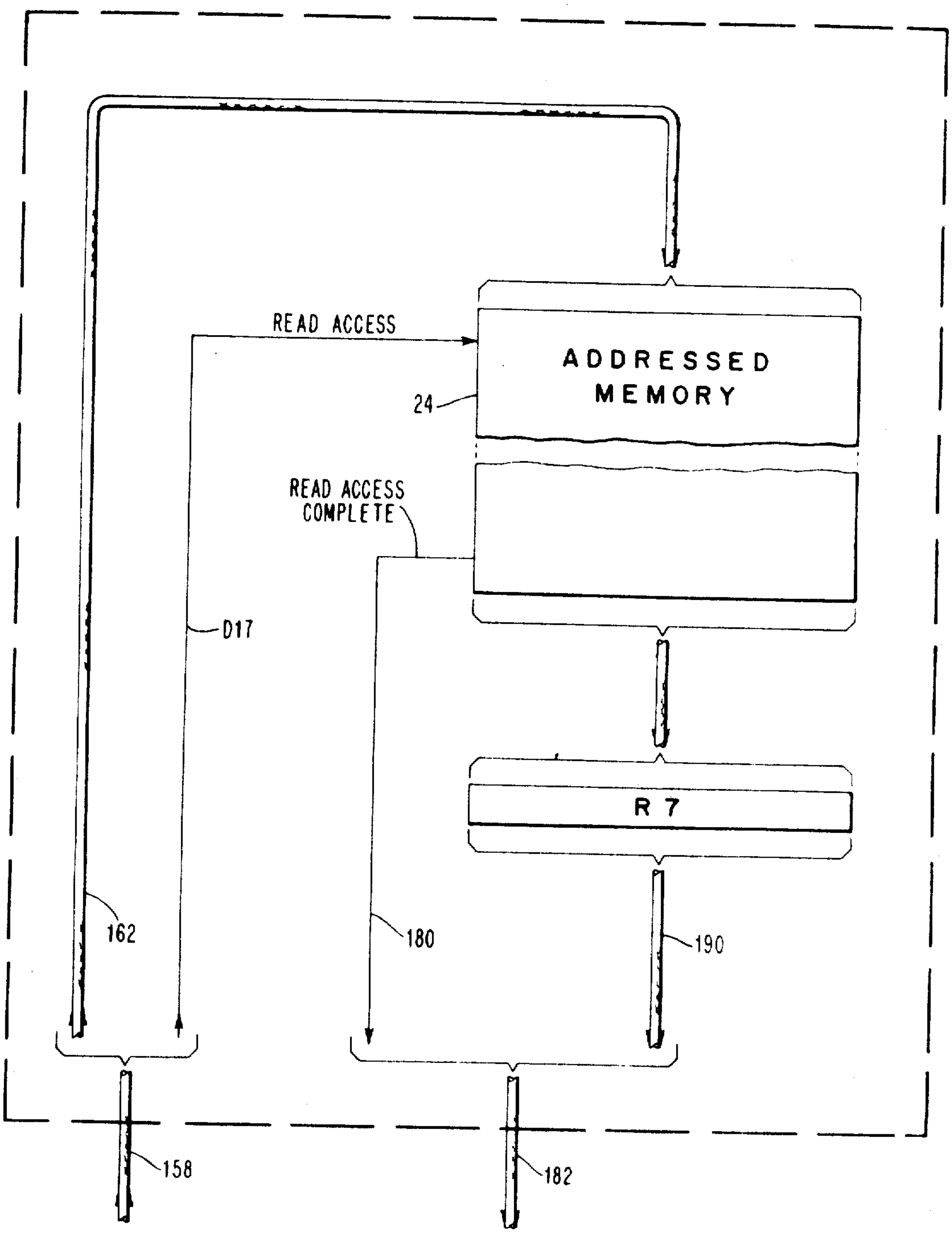
FIG. 7 is a schematic showing of Unit II in the decoder.

FIG. 5 is a general block diagram of the decoding processor, the various parts of which are illustrated in detail in FIGS. 6A to 9B as indicated. Units I and II of the processor correspond to the similarly designated units in FIGS. 3 and 4. The control logic, FIGS. 5, 8A and 8B, operates in response to timing or clock pulses emitted by the pulse generator, FIGS. 5, 9A and 9B, to control the operations of the first decoding stage, unit I (FIGS. 5 and 6A) and the second decoding stage, unit II (FIGS. 5 and 7). The numbered flow lines extending between the various units shown in FIG. 5 correspond to like-numbered cables shown in the subsequent views.

In Unit I, FIGS. 6A and 6B, as mentioned above, there is an associative memory 20 (also represented diagramatically in FIG. 4) which contains three-state storage cells, each of which is settable to a binary 1 state or a binary 0 state or else to a third "don't care" state which masks the cell against interrogation of its 1 or 0 state, i.e., prevents the cell from generating a mismatch signal regardless of whether a 1 or 0 interrogating signal is applied thereto. Three-state and other multi-state associative memory cells are well known, several forms of such cells being shown, for example, in U.S. Pat. No. 3,543,296 issued to P.A.E. Gardner et al. on Nov. 24, 1970; hence the construction of such a cell is not disclosed in detail herein. Still another form of associative memory cell which uses two conventional memory cells operating together in a three-state mode is shown in the copending application of Josef Raviv and Michael A. Wesley, Ser. No. 62,306, filed Aug. 10, 1970. Because of the fact that the associative memory 20 contains one and only one word to match any interrogating prefix, it can be assumed that there will be a match in one and only one row of this memory for each interrogation. This enables the control circuitry 30, FIGS. 6A and 11, which couples the output of associative memory 20 to the input of read-only memory 22, to be of relatively simple construction.

Figure 11:
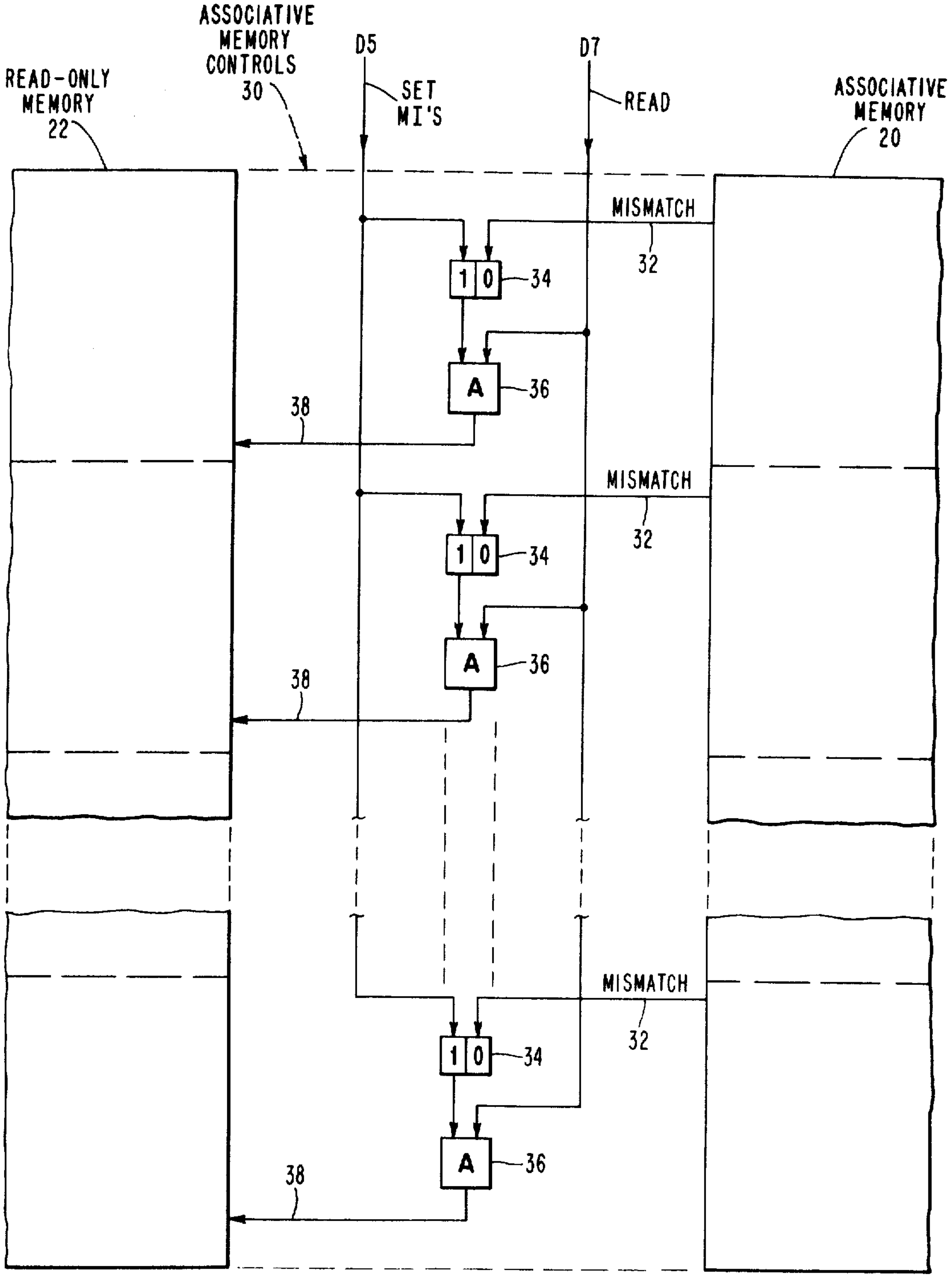
FIG. 11 is a circuit diagram showing some of the details of the associative memory and its controls.

Referring to FIG. 11, each row or word of cells in the memory 20 has a mismatch line 32 on which a signal appears if any one of its cells (other than a cell in its "don't care" state) stores a bit whose value differs from that of the interrogating bit in that column. The matching word therefore is the one indicated by the absence of a signal on its mismatch line 32. Each mismatch line 32 is coupled to the 0 input terminal of a respective match indicator flip-flop 34. The 1 input terminals of the match indicators 34 are connected to a wire D5, which intermittently is pulsed (in a manner to be explained) in order to set all match indicators 34 to their 1 states. During the interrogation of memory 20, all match indicators 34 are reset to their 0 states except the one associated with the matching word in memory 20. The 1 output side of each match indicator 34 is connected to an input terminal of a two-input AND circuit 36 associated therewith. The other input terminal of each AND circuit 36 is connected to a wire D7, which is pulsed at the appropriate time for reading the output of the associative memory 20. One of the AND circuits 36 will be conductive, this being the one associated with the matching word in memory 20, enabling the read pulse to pass into the address line 38 connected to the output of this AND circuit. One such address line 38 is provided for each row of memory cells in the read-only memory 22, FIGS. 11 and 4. Thus, the absence of a mismatch signal on a selected one of the mismatch lines 32 causes a match-indicating signal to appear on the corresponding one of the address lines 38.

From the foregoing explanation it is seen that whenever an interrogating prefix is applied as an argument to associative memory 20, a selected one of the rows of storage cells in read-only memory 22 will be addressed by that prefix. Argument register R5, FIGS. 4 and 6B, has a capacity sufficient to store the longest prefix, which in the present example is assumed to contain 6 bits. Each word of the associative memory 20 likewise is capable of storing as many as 6 bits. However, some of the words have fewer significant bits than others. Before a meaningful interrogation can be made, the interrogating prefix must be properly registered in the argument register R5, with its highest-order bit positioned at the high-order end of register R5. When the interrogation is completed, the next prefix must be brought into proper registration for interrogation. Since the number of bits which intervene between the beginning of one prefix and the beginning of the next prefix may vary from one input code word to another, the control logic must ascertain from unit I how many input bits are to be processed through the decoder, and how they are to be processed, in order to accomplish the decoding of each input code word before the deciphering of the next input code word can commence. The specific way in which such registry is achieved will become apparent as the description proceeds.

For the purpose of the present description, it is assumed that the operator of the system knows in advance the number of input code words which are to be decoded. This number is set into a word counter 40, FIG. 8B, in the control logic circuitry at the beginning of a decoding run and is progressively decremented as each input code word is deciphered. When the remaining word count is reduced to zero, the decoding process halts.

Figure 9A:
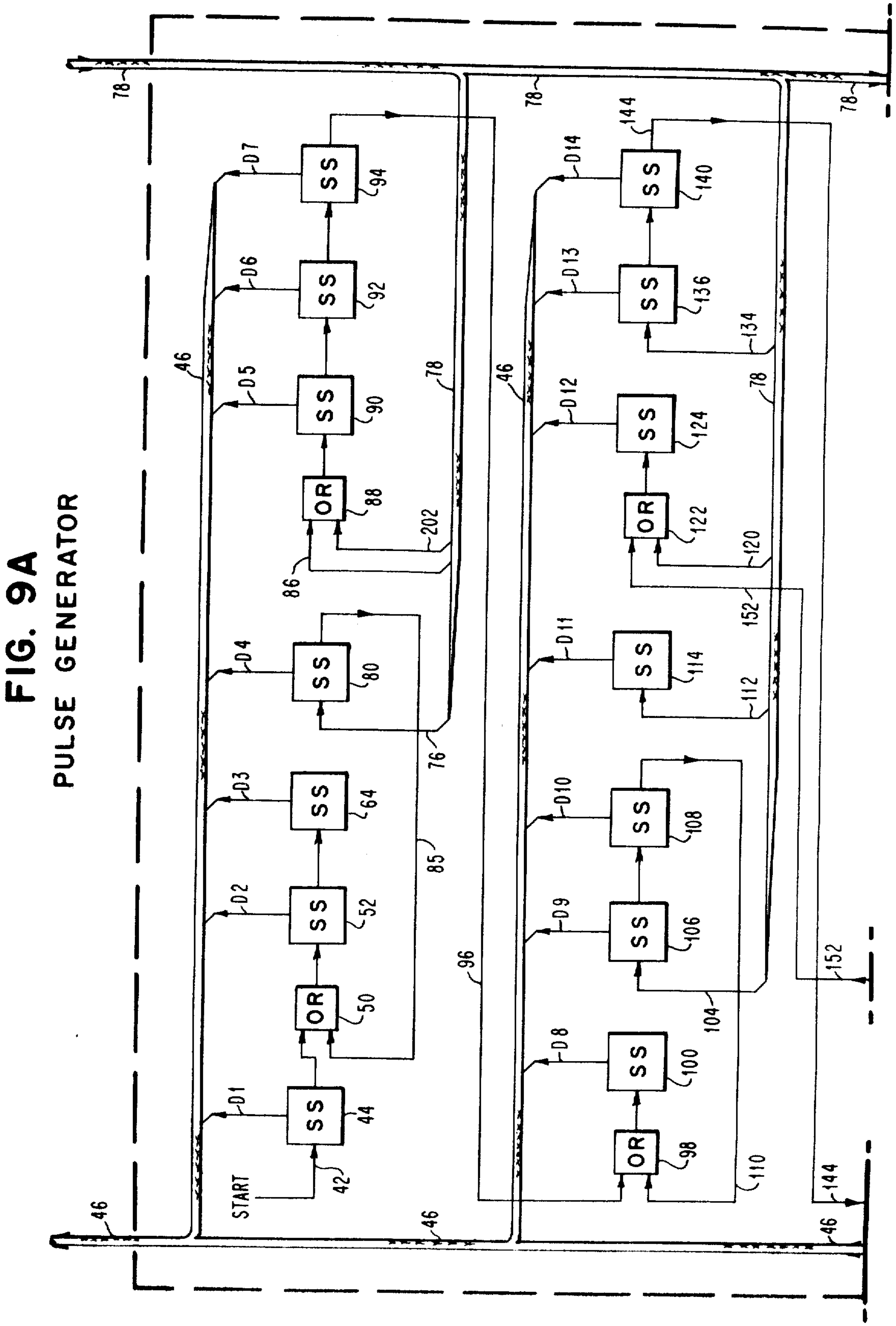
FIGS. 9A and 9B together constitute a circuit diagram of the pulse generator.
Figure 9B:
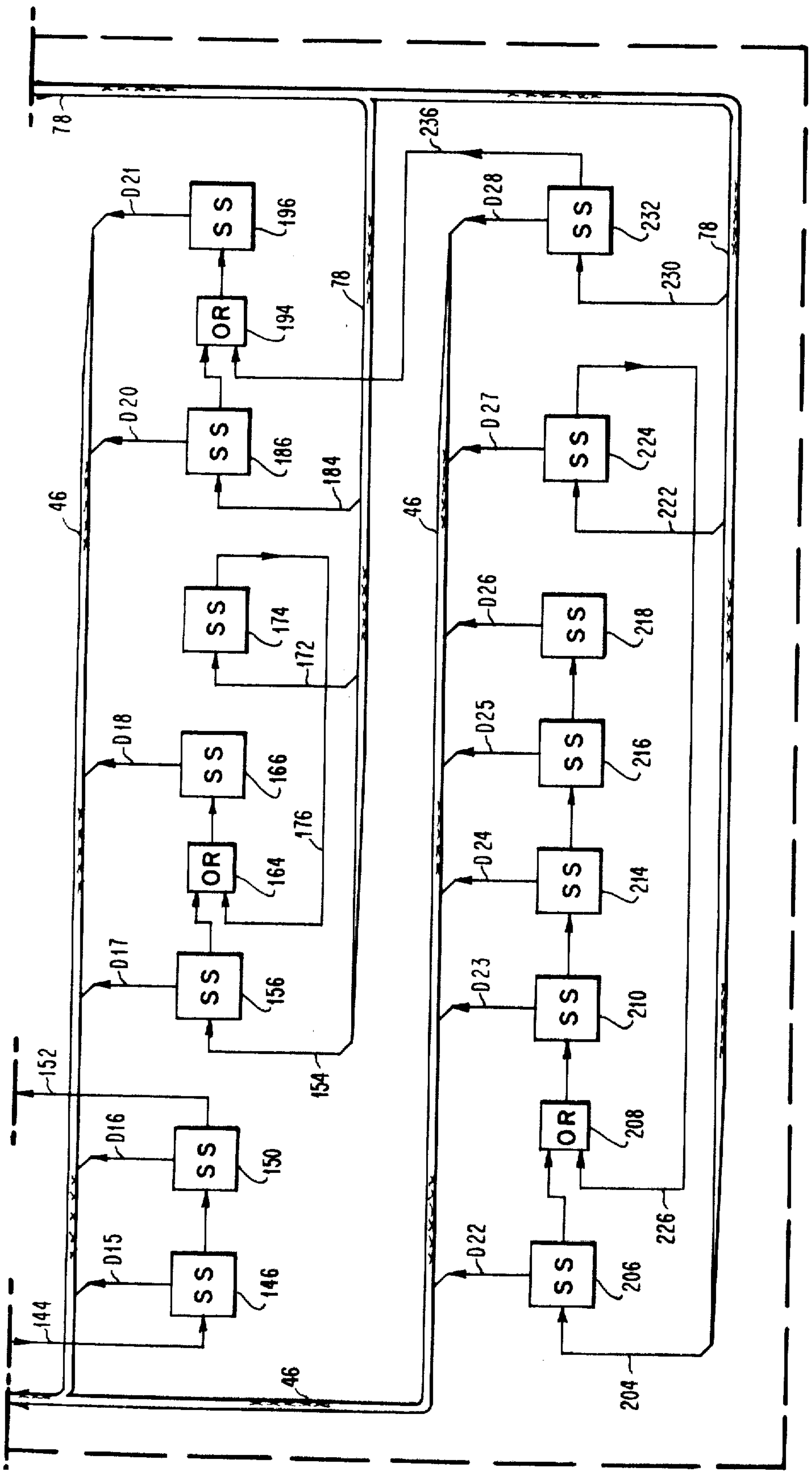
Figure 10:
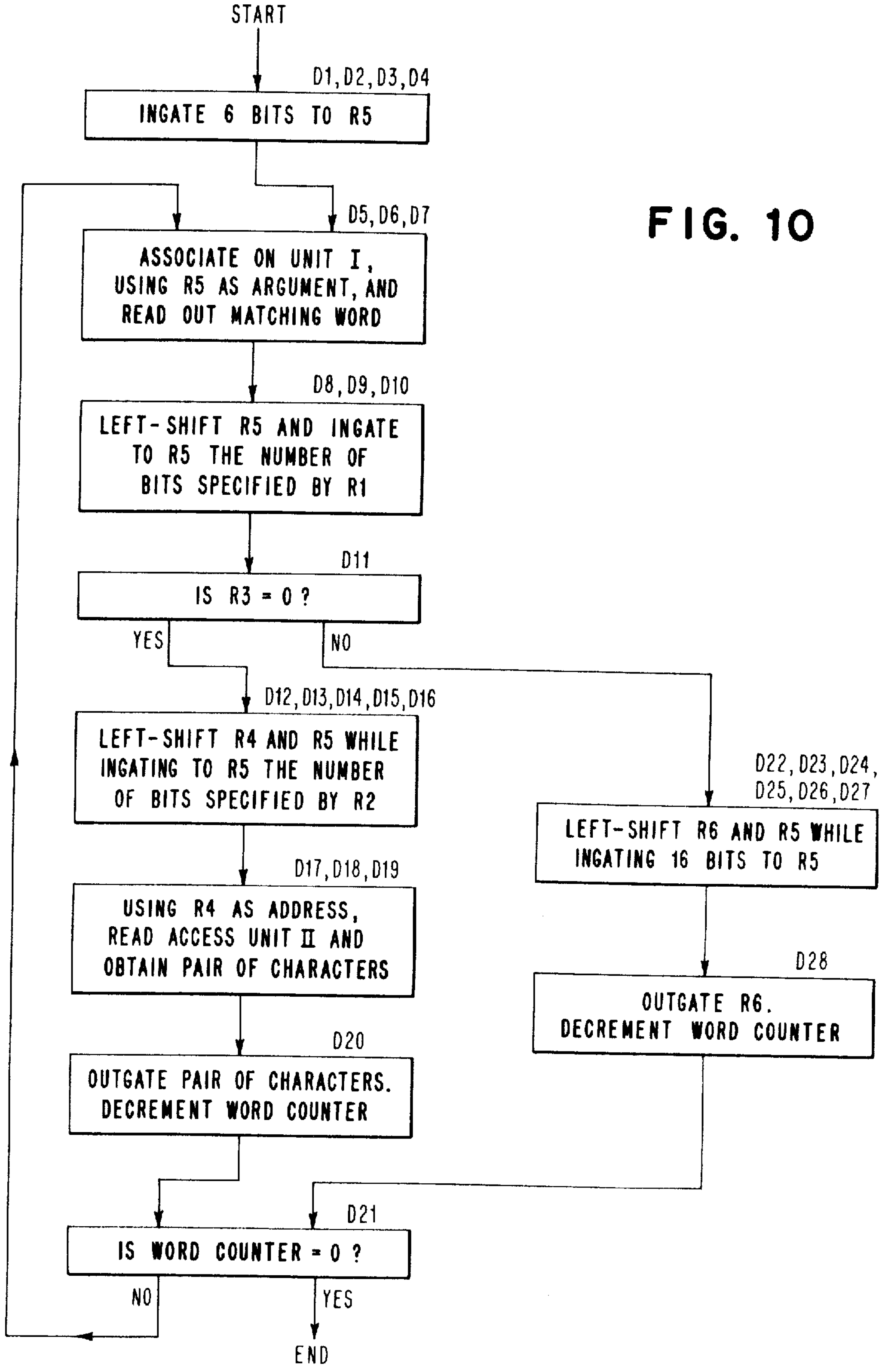
FIG. 10 is a flowchart depicting the operation of the decoder.

The operation of the system can be more readily understood if frequent reference is made to the flowchart shown in FIG. 10 during the course of the following description. Each of the boxes in this flowchart is associated with one or more reference numbers having the initial letter D (e.g., D1, D2, etc.), denoting various steps in the decoding process. The designations D1, D2, etc. also are applied to various wires leading from the single shots SS of the pulse generator, FIGS. 9A and 9B, which generate the clock pulses for timing the various operations of the decoder in the manner explained hereinafter.

Figure 8B:
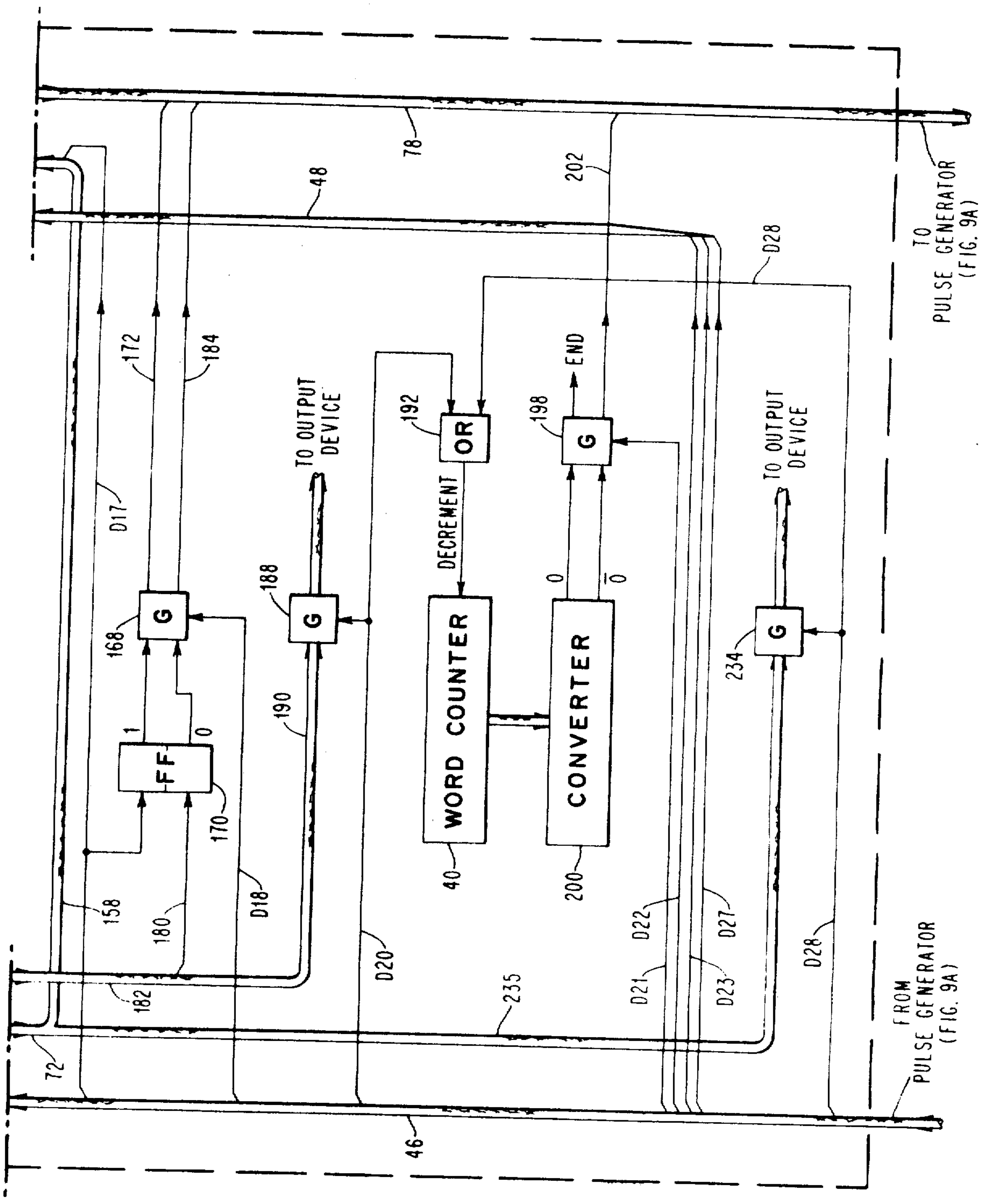

The decoding process is initiated by applying a "-start" pulse to a wire 42, FIG. 9A, that leads to the input terminal of a single shot (SS) numbered 44, which is the first of a chain of single shots that control the timing and sequence of the various decoding functions. Single shot 44 turns on, generating a clock pulse on wire D1, which extends through a cable 46, FIGS. 9A, 8B and 8A, and thence through a cable 48, FIGS. 8A and 6A, to a suitable device (not shown) for setting the register R1, FIG. 6A, to the binary value 0110, or 6 in decimal notation. In this phase of the operation, the register R1 functions as a descending counter for enabling six bits of incoming data to be entered or "ingated" into the 6-bit argument register R5, FIG. 6B, of the associative memory 20. The manner in which this ingating is accomplished now will be explained.

When single shot 44, FIG. 9A, turns off, it sends a signal through OR circuit 50 to a single shot 52, which turns on to generate a timing pulse in wire D2 (cable 46) FIGS. 9A and 8A. This D2 timing pulse extends in parallel through the OR circuits 54 and 56, FIG. 8A, to the wires 58 and 60, respectively, that enter the cable 48. Referring now to FIG. 6A, the pulse on wire 60 extends to a decrementing device (not shown) for the register R1, causing the setting of this register to be decremented by 1. In this instance, since the initial setting of register R1 was 0110 (or 6 in decimal notation), this setting now is reduced to 0101, or 5 in decimal notation. Meanwhile, the pulse on wire 58, FIGS. 6A and 6B, is applied to a gate 62, enabling this gate to pass the first digit from the input bit stream into the lowest-order position of the argument register R5 for the associative memory 20. thus, the first bit of the argument now has entered the register R5.

It now becomes necessary to test the setting of register R1 (which is being used as an argument bit counter) to see whether this setting has been reduced to 0. In the present instance it has been assumed that the setting was just reduced from 6 to 5; hence the all-zero setting has not yet been attained. The 0 outputs of the various flip-flops in the register R1 are applied in parallel to an AND circuit 66, FIG. 6A. For a non-zero setting of R1, the output of AND circuit 66 is such that no signal is applied to the output wire 68. The length-counter setting is tested when the single shot 52, FIG. 9A, goes off, causing the single shot 64 to be turned on, thereby pulsing the wire D3. This conditions a gate 70, FIG. 8A to pass the non-zero signal through inverter 74 to a wire 76, which extends through cable 78, FIGS. 8A, 8B and 9A, to single shot 80, which turns on to generate a timing pulse on wire D4. This D4 timing pulse passes through OR circuit 82, FIG. 8A, and thence through a wire 84, FIGS. 8A, 6A and 6B, to a left shift device for argument register R5. The contents of R5 thereupon are shifted left by one bit position, thereby leaving the lowest-order bit position free to receive the next input bit.

When single shot 80, FIG. 9A, turns off, it sends a pulse through wire 85 and OR circuit 50 to single shot 52, turning it on again. This reinitiates the sequence of steps D2 and D3 for ingating another bit to the argument register R5, FIG. 6B, decrementing the length counter R1, FIG. 6A, and testing the resultant setting of this counter. If the setting still is other than zero, single shot 80 again is turned on to execute step D4 for causing a left shift of the argument register and a return to step D2. This sequence of steps D1–D4 is summarized below:

| | |
|---|---|
| jt D1 | Set length counter R1 to 0110 (decimal 6) |
| D2 | Ingate one bit to right-hand end of R5. Decrement R1. Go to D3. |
| D3 | Test R1. If not zero, go to D4. (If zero, go to D5, which will be described.) |
| D4 | Shift R1 left one bit. go back to D2. |

Eventually, six bits of information will have entered argument register R5, and the length setting (R1) will have reduced to zero. Under these conditions, when the D3 timing pulse is applied to gate 70, FIG. 8A, a zero-indicating signal is passed from wire 68 through gate 70 to a wire 86, FIGS. 8A and 9A, thence through an OR circuit 88 to a single shot 90, which is turned on to generate a timing pulse on wire D5. The D5 timing pulse passes through cable 46, FIGS. 9A, 8B and 8A, and thence through cable 48, FIGS. 8A and 6A, to the controls 30 of the associative memory 20, FIGS. 6A and 11, for setting the match indicators of the associative memory to their 1 states. This prepares the associative memory 20 for a search on the argument stored in the argument register R5.

The register R5 stores a 6-bit argument which includes the prefix of the input code word which is to be decoded. In some instances an input code word may have a 6-bit prefix, but in most cases the prefix will be shorter than six bits; consequently the argument may contain 1 or more bits from the remainder of the current input word, and there may be occasions when the argument will contain all of the bits in one code word followed by 1 or more bits in the succeeding code word as well. As explained hereinabove, the associative memory 20 is so designed that it operates only upon the prefix which is positioned at the high-order (left-hand) end of the argument register R5. The associate or search operation is initiated when the single shot 90, FIG. 9A, turns off, thereby turning on the single shot 92 to place a pulse on the wire D6, which passes through cables 46 and 48, FIGS. 9A, 8B, 8A and 6A to the argument register R5, FIG. 6B, causing the argument stored in this register to be applied to the associative memory 20. This activates the matching word stored in memory 20 and conditions the corresponding word of read-only memory 22 for readout.

As single shot 92, FIG. 9A, goes off, single shot 94 is turned on to generate a timing pulse which is applied through wire D7, FIGS. 9A, 8A and 6A, to the read line for the associative memory controls 30. This effects the readout of the various items of information stored in the associated word row of the read-only memory 22. Thus, the prefix length is read from the prefix length store and is entered into the three lowest-order positions of register R1. This register has a 4-bit capacity because of the fact that it serves as a length counter in a later phase of the operation, in which it must be able to store a value of 15 (or 1111 in binary notation). In the present phase of the operation, however, no more than 3 bit positions of register R1 are utilized for storing a prefix length indication. The fourth or highest-order position, therefore, must be set to 0. This is accomplished by the D7 timing pulse at the time when the read line is energized as indicated in FIG. 6A.

The 2-bit item read out from the remainder length store of the read-only memory 22, FIG. 6A, representing the number of bits remaining in the input code word exclusive of its prefix, is stored in register R2. In register R3 there is stored a single bit which is 1 if the current prefix is a COPY code and 0 in all other conditions. From the base address store of the read-only memory 22 there is read a 5-bit base address which is stored in register R4. Thus, the registers R1 through R4, FIGS. 6A and 6B, now store information which indicates, respectively, the length of the prefix, the length of the remainder of the input code word, an indication of whether or not the prefix is a COPY code, and a base address which constitutes part of the information needed for generating the final address at which the deciphered word ultimately will be found in unit II (FIGS. 4 and 7).

When the single shot 94 goes off, FIG. 9A, it sends a pulse through wire 96 and OR circuit 98 to single shot 100, which turns on to generate a timing pulse on wire D8. Referring to the flowchart in FIG. 10, this initiates a sequence of steps D8, D9 and D10 for shifting the prefix of the current input code word out of the argument register R5 and feeding an equal number of new bits into this argument register as the remainder of the current input word is shifted leftward to replace the prefix. The prefix no longer is needed once the association has been performed by memory 20 using this prefix value.

To consider the steps just described in detail, the D8 timing pulse generated by single shot 100, FIG. 9A, is applied to a gate 102, FIG. 8A, thereby conditioning this gate to pass a 0 or non-0 signal, as the case may be, from the length counter R1, FIG. 6A. Since the register R1 currently stores the prefix length, it has a non-0 output on wire 68, FIGS. 6A and 8A, which is inverted by the inverter 74 and passed through the gate 102 to a wire 104 leading through cable 78 to single shot 106, FIG. 9A. Single shot 100 meanwhile turns off without further effect. When single shot 106 turns on, it puts a timing pulse on wire D9 which passes through OR circuit 82, FIG. 8A, and wire 84, FIGS. 6A and 6B, to the left shifting device in the argument register R5. This causes the leading bit of the old prefix to be shifted out of register R5.

As single shot 106 turns off, single shot 108 turns on to place a timing pulse on wire D10, FIGS. 9A and 8A, and this pulse passes through OR circuits 54 and 56 to the wires 58 and 60, respectively. The pulse on wire 58 extends to the input gate 62, FIG. 6B, for ingating the next succeeding bit into the argument register R1. At the same time, the pulse on wire 60, FIGS. 8A and 6A, causes the setting of register R1 to be decremented by 1.

When single shot 108 goes off, it sends a pulse through wire 110 and OR circuit 98 back to single shot 100, FIG. 9A, turning it on again. This causes a D8 timing pulse to be generated again. As a result of this the gate 102, FIG. 8A, again is activated to test the setting of the register R1, FIG. 6A. If the setting has not yet been reduced to 0, this indicates that 1 or more bits of the old prefix still remain in the argument register R5. Therefore, the steps D9 and D10 again are repeated to shift another bit out of register R5, bringing a new bit into this register and reducing the setting of the length counter R1 as described above.

Ultimately the setting of register R1 is reduced to 0. Then, when the D8 timing pulse is generated by single shot 100, FIG. 9A, and gate 102, FIG. 8A, is activated, the 0 signal transmitted by wire 68 from register R1 passes through gate 102 to the wire 112, FIGS. 8A and 9A. This causes single shot 114 to be turned on for placing a timing pulse on wire D11, FIGS. 9A and 8A, thereby activating a gate 116. The input to gate 116 will be either a 1 bit or a 0 bit supplied by the 1-bit register R3, FIG. 6A, which indicates whether the prefix of the current input code word is or is not a COPY code. This test is indicated on the flowchart, FIG. 10, at the step No. D11. For the present it will be assumed that the prefix which has just been decoded is not a COPY code. Under these circumstances the setting of R3 is 0, causing an output to appear on a wire 118 leading to the gate 116, FIG. 8A. If the prefix had been a COPY code, the wire 119 rather than wire 118 would have been energized.

Still continuing on the assumption that the 0 output wire 118 from register R3 has been energized, such energization is extended through gate 116, FIG. 8A, and wire 120, FIGS. 8A and 9A, thence through OR circuit 122 to a single shot 124. This initiates a step for testing to see whether there are any digits remaining in the current input code word after the prefix has been deducted therefrom. The information as to how many bits are in the remainder currently is stored in register R2, FIG. 6A. As single shot 124, FIG. 9A, turns on, it pulses wire D12, FIGS. 9A and 8A, to activate a gate 126. The information as to the setting of register R2 is conveyed by a wire 128, FIG. 6A, leading from the output side of an AND circuit 130. The input side of AND circuit 130 is connected to the 0 terminals of the flip-flops in register R2. If there is at least one bit remaining in the current input code word subsequent to its prefix, no signal is conducted by the AND circuit 130, and the wire 128 remains at its normal low level of energization. This causes a signal to be passed by inverter 132, FIG. 8A, through gate 126 and wire 134, FIGS. 8A and 9A, to single shot 136, which turns on to pulse wire D13. This D13 timing pulse passes through cables 46 and 48 to the left shift device for the register R4, which presently stores the value that was read out of the base address store of memory 22. The contents of R4 therefore are shifted one bit position to the left, FIG. 6B.

As this occurs, it is necessary to transfer into the register R4 (at its low-order end) the remainder bit which currently is stored at the high-order end of register R5. This is accomplished when single shot 136, FIG. 9A, turns off and causes single shot 140 to turn on, thereby emitting a pulse on wire D14, which extends through cables 46 and 48 to gate 142, FIG. 6B. As this gate is activated, it passes the 1 or 0 bit from the high end of register R5 to the low end of register R4. When single shot 140, FIG. 9A, goes off, it sends a pulse through a wire 144 to energize single shot 146, FIG. 9B, for generating a pulse on wire D15. This brings about a left shift of register R5, to move the next bit of the code word into the highest-order position of R5. Thus, the timing pulse on wire D15, FIGS. 9A and 8A, passes through OR circuit 82 to wire 84, which leads to the left shift device for register R5, FIG. 6B. The contents of R5 thereupon are shifted left one bit position. Now a new bit must be brought into the lowest-order position of R5. This occurs when single shot 146, FIG. 9B, turns off and causes single shot 150 to turn on, thereby pulsing wire D16. This D16 timing pulse passes through OR circuit 54, FIG. 8A, to wire 58 which leads to the ingating device 62, FIG. 6B, causing it to enter a new bit into the lowest order of register R5. At the same time, the D16 timing pulse also passes to a decrementing device for register R2 to reduce the remainder count by 1 (FIG. 6A).

At this point the step D12 is repeated to test the setting of the remainder register R2. As single shot 150 goes off, FIG. 9B, it pulses a wire 152 that is connected through OR circuit 122, FIG. 9A, to single shot 124, thereby regenerating the D12 timing pulse. As explained above, this again activates gate 126, FIG. 8A, to perform the zero test on the setting of the remainder register R2. If the test again shows a non-zero setting, then there will be a repetition of the sequence consisting of step D13 (left-shift R4), step D14 (gate lefthand bit of R5 to righthand bit position of R4), step D15 (left-shift R5), D16 (ingate righthand bit of R5; decrement R2) and step D12 (test setting of R2).

Ultimately all of the remaining bits in the current input code word will have been shifted into register R4 through its right end, and correspondingly, the original base address stored in R4 will have been shifted left by a like number of bit positions. This procedure effectively combines a modified base address (corresponding to the prefix) with a displacement value corresponding to the remainder of the current input code word, which by now has disappeared from the argument register R5. In its place, register R5 now stores the leading part, at least, of the next input code word, the highest-order bit of which is now at the lefthand end of register R5. Thus, the proper number of shifts have been performed to bring the next succeeding code word into proper registry for association.

It now is necessary to read from unit II, FIG. 7, the fixed-length code equivalent of the input code word that has just been shifted out of register R5. The setting of the remainder register R2 by this time has been reduced to zero. This R2 setting is tested in due course, when the wire D12 is pulsed to activate the gate 126, FIG. 8A, and the non-zero signal on wire 128, FIGS. 6A and 9A, now passes through gate 126 and wire 154 to single shot 156, FIG. 9B. As this single shot turns on, it causes a pulse to pass through wire D17 and cables 46 and 158, FIGS. 9A, 8B, 8A and 7, to the read access device for memory 24 in unit II of the processor, FIG. 7.

When memory 24 is thus accessed, it will read out the data stored at the address indicated by register R4, FIG. 6B, which now serves as the memory address register for memory 24. In this example, the data to be read out is a character pair. This address is communicated to memory 24 from register R4 through cables 160, 72 and 158 (FIGS. 6B, 8A, 8B and 7) and finally cable 162, FIG. 7. The readout of the addressed word (i.e., character pair) from memory 24 to the data register R7 now commences. To insure that this read process is completed before any further operation takes place, a read completion test is performed. This occurs when single shot 156, FIG. 9B, goes off, sending a pulse through OR circuit 164 to single shot 166, which turns on to pulse wire D18. The D18 timing pulse is applied to gate 168, FIG. 8B, conditioning this gate to test for read access completion. A flip-flop 170 associated with gate 168 was set to its 1 state previously when the wire D17 was pulsed to initiate the read access. If flip-flop 170 still is in its 1 state, the gate 168 now passes a signal to wire 172 leading to single shot 174, FIG. 9B. When single shot 174 goes on, it sends a pulse through wire 176 and OR circuit 164 to single shot 166, thereby maintaining single shot 166 energized. Single shot 174 in turn is maintained energized so long as single shot 166 remains on. Thus, both single shot 166 and 174 are kept on until the read access of memory 24, FIG. 7, is completed.

It will be noted that whereas a read access completion test is required for memory 24 in unit II, no such test was specified for read-only memory 22 in unit I. This is because memory 24 is accessed through a memory address register and operates in a conventional read-regeneration cycle, during which the addressed data is destructively read out, then rewritten. Memory 22, on the other hand, is assumed in the present embodiment to be accessed directly through the match indicators of the associative memory 20 (FIG. 11), and its stored data is nondestructively read, without regeneration; hence it is not necessary to test for completion of the read access operation in that case.

When the addressed information has been located and read out to register R7, the memory 24 emits a read access completion signal, which is conducted by wire 180, FIG. 7, extending through cable 182, FIGS. 7, 8A and 8B, to the 0 input terminal of flip-flop 170. As this flip-flop is reset, it removes energization from wire 172 and pulses wire 184, which leads to the single shot 186, FIG. 9B. Single shots 174 and 166 deenergize. Single shot 186 energizes to generate a timing pulse on wire D20, thereby outgating the fixed-length code word in register R7 (2 bytes in the example). Thus the D20 timing pulse activates a gate 188, FIG. 8B, enabling the contents of register R7 to pass through cables 190 and 182, FIGS. 7, 8A and 8B, and gate 188 to the output utilization device. Concurrently, the timing pulse on wire D20 also passes through an OR circuit 192, FIG. 8B, to the decrementing device for the word counter 40, reducing the word count by 1.

The readout of the decoded word now has been accomplished. Before proceeding further, the system must test the setting of the word counter 40 to see whether there are any more input code words to be decoded. If not, the operation is ended. This test is initiated when single shot 186, FIG. 9B, goes off to send a pulse through OR circuit 194 to single shot 196. As single shot 196 goes on, it pulses wire D21 leading to gate 198, FIG. 8B, which tests the output of a converter 200 associated with word counter 40. Converter 200 translates the setting of the word counter to a zero or non-zero output. Assuming for the present that the word count has not yet been reduced to zero, the non-zero signal passes through gate 198 to a wire 202, and thence through OR circuit 88 to single shot 90, FIG. 9A. Referring to the flowchart, FIG. 10, this action reinitiates the sequence of steps commencing with D5. The prefix of the new input code word standing in argument register R5 is now used as an argument to start a new decoding process.

If the word counter 40, FIG. 8B, stands at zero when it is tested, the zero output of converter 200 will pass through gate 108 at the appropriate time (D21) to provide a signal for ending the operation of the decoder. Step D5 is not reinitiated under these conditions.

"COPY" Operation

It was assumed in the foregoing description that the code word to be deciphered was a variable-length code word that did not have the COPY code as its prefix. When an input word having a COPY code prefix is encountered, the register R3, FIG. 6A, will store a 1 bit after the information in the memory location addressed by the COPY code has been read out of the memory 22. When this condition exists, the information stored in registers R2 and R4 is immaterial. Register R1 stores the binary value 0101, or 5 in decimal notation, which is the length of the COPY code in the example.

The steps designated D5 through D10, FIG. 10, are executed in the same manner for a COPY code as they would be for any other prefix. The COPY code leaves register R5. At step D11 (i.e., when wire D11, FIGS. 9A and 8A, is pulsed), it will be the "1" output wire 119 (rather than the "0" output wire 118) leading from the register flip-flop R1, FIG. 6A, that is energized. Under these conditions the gate 116, FIG. 8A, will extend energization from wire 119 to wire 204, FIGS. 8A and 9B, leading to a single shot 206, thereby initiating a special sequence of steps D22 through D28, FIG. 10, in lieu of the normal sequence of steps D12 through D20.

As single shot 206 energizes, it pulses the wire D22 which passes through cables 46 and 48, FIGS. 9B, 8B, 8A and 6A, to a device for setting the register R1 to represent the binary equivalent of the decimal value 16, which is the number of bits to be shifted out of the register R5 in this example when the system is operating in the COPY mode. Since register R1 is assumed to have only a 4-bit capacity in this embodiment, the binary value 10000 (or 16) actually is registered as 0000 in R1.

As single shot 206 goes off, FIG. 9B, it sends a pulse through OR circuit 208 to single shot 210, which turns on to pulse wire D23, passing through cables 46 and 48, FIGS. 9B, 8B and 6A, to gate 212, FIG. 6B. As gate 212 is activated, it opens a transfer path for passing the leftmost bit stored in register R5 into the rightmost position of register R6. Thus, the first bit of the 16-bit word following the COPY code has been entered in register R6. Single shot 210, FIG. 9B, then goes off and turns on the next single shot 214, which pulses wire D24, FIGS. 9B and 8A. This D24 timing pulse passes through OR circuit 82, FIG. 8A, and wire 84, FIGS. 8A, 6A and 6B to the left shift device for register R5, causing the contents of R1 to shift one bit position to the left.

As single shot 214, FIG. 9B, goes off, it turns on single shot 216 to pulse wire D25, FIGS. 9B and 8A. This D25 timing pulse passes through OR circuits 54 and 56 to wires 58 and 60, FIGS. 8A, 6A and 6B, for activating the gate 62 to ingate one new bit into register R5 and also to decrement register R1. The decrementing of R1 in this instance changes its setting from 0000 to 1111 (or 15 in decimal notation). Single shot 216, when it turns off, will cause single shot 218, FIG. 9B, to turn on, generating a timing pulse on wire D26, FIGS. 9B and 8A, leading to gate 220. As gate 220 is thus activated, it causes the setting of register R1 to be tested for a zero condition. In this instance the register R1 is not at a zero setting; hence a non-zero signal is passed by inverter 74 through gate 220 and wire 222, FIG. 8A, to single shot 224, FIG. 9B, which turns on to generate a timing pulse on wire D27, passing through cables 46 and 48, FIGS. 9B, 8B, 6A and 6B, to a left shift device for register R6. The contents of R6 thereupon are shifted left one bit.

When single shot 224, FIG. 9B, goes off, it sends a pulse through wire 226 and OR circuit 208 to single shot 210, which turns on to reinitiate the sequence of steps D23 through D27 as just described. To recapitulate this action, the left-most bit of register R5, FIG. 6B, is gated to the rightmost position of register R6; register R5 is left-shifted one bit; a new bit is ingated to the rightmost position of R5; the setting of R1 is decremented by 1; the setting of R1 is tested for a zero or non-zero condition; and if it is non-zero, register R6 is left-shifted one bit. This cycle is repeated as many times as necessary until the 16 bits of the incoming code word that formerly had been appended to the COPY code have passed through register R5 into register R6.

It is assumed now that the setting of register R1 has been reduced to zero. When the timing pulse on wire D26, FIGS. 9B and 8A, is generated in due course under these conditions, the gate 220 becomes effective to pass a zero output signal from register R1 through AND circuit 66, wire 68, FIGS. 6A and 8A, and wire 230 to single shot 232, FIG. 9B. As single shot 232 turns on, it pulses wire D28, which passes through cable 46 to a gate 234, FIG. 8B. The activation of gate 234 causes the contents of register R6, consisting of the 16-bit fixed-length code word, to pass through cables 235 and 72, FIGS. 6A, 8A and 8B, to the output utilization device. Thus, the 16-bit code word formerly appended to the COPY code prefix has been segregated out and fed to the output device. Concurrently with this action, the D28 timing pulse also passes through the OR circuit 192, FIG. 8B, to the device for decrementing the word counter 40, reducing the word count by 1.

As single shot 232, FIG. 9B, turns off, it sends a pulse through wire 236 and OR circuit 194 to single shot 196, which turns on to generate a timing pulse on wire D21, FIGS. 9B and 8B. As previously described, this activates gate 198 to test the setting of the word counter for a zero or non-zero condition. A zero setting terminates the decoding process. A non-zero setting returns the operation to step D5, FIG. 10, for processing the next code word through the decoder.

To summarize the operation of the decoder in somewhat greater detail than is shown by the flowchart, FIG. 10, there is set forth below a table of the various functions (steps D1, D2, etc.) that are performed in response to the respective timing pulses emitted by the pulse generator, FIGS. 9A and 9B:

TABLE C

| Step or Timing Pulse | Functions Performed |
|---|---|
| D1 | Set R1 = 0110. Go to D2. |
| D2 | Ingate rightmost bit of R5. Decrement R1. Go to D3. |
| D3 | Test setting of R1. If 0000, go to D5. If not 0000, go to D4. |
| D4 | Left-shift R5. Go to D2. |
| D5 | Set match indicators to 1. Go to D6. |
| D6 | Associate on argument in R5. Go to D7. |
| D7 | Read out matching word from memory 22. Reset leftmost bit of R1 to 0. Go to D8. |
| D8 | Test setting of R1. If 0000, go to D11. If not 0000, go to D9. |
| D9 | Left-shift R5. Go to D10. |
| D10 | Ingate rightmost bit of R5. Decrement R1. Go to D8. |
| D11 | Test setting of R3. If 0, go to D12. If 1, go to D22. |
| D12 | Test setting of R2. If 00, go to D17. If not 00, go to D13. |
| D13 | Left-shift R4. Go to D14. |
| D14 | Gate leftmost bit of R5 to rightmost position of R4. Go to D15. |
| D15 | Left-shift R5. Go to D16. |
| D16 | Ingate rightmost bit of R5. Decrement R2. Go to D12. |
| D17 | Read access memory 24 in unit II, using R4 as memory address register. Go to D18. |
| D18 | Test for completion of read access. If complete, go to D19. If not complete, go to D20. |
| D19 | Delay further operation if read access is still in progress. Return operation to D18. |
| D20 | When read access is completed and addressed character pair is in R7, outgate this character pair from R7. Decrement word counter 40. Go to D21. |
| D21 | Test word counter 40. If zero, end operation. If not zero, return to D5. |
| D22 | If setting of R3 is 1 (step D11), reset R1 to 0000 (lower 4 bits of binary 16) and go to D23. |
| D23 | Gate leftmost bit of R5 to rightmost position of R6. Go to D24. |
| D24 | Left-shift R5. Go to D25. |
| D25 | Ingate rightmost bit of R5. Decrement R1. Go to D26. |
| D26 | Test setting of R1. If 0000, go to D28. If not 0000, go to D27. |
| D27 | Left-shift R6. Go to D23. |
| D28 | Outgate contents of R6. Decrement word counter. Go to D21. |

There has been described herein an invention which enables data processing systems to utilize fixed-length code words that have been compacted into short code words of variable-length by a novel process that not only encodes the words according to their frequency of occurrence but further encodes them according to the respective frequencies with which the different code word lengths would occur under normal variable-length coding conditions. The invention provides a ready way to decode data which has thus been encoded. It further provides a way to minimize the amount of hardware needed for carrying out these encoding and decoding processes, without significant loss of compaction, by the use of the COPY code feature which enables fixed-length code words of relatively infrequent occurrence to be handled essentially as uncoded words.

The control logic (FIGS. 5, 8A and 8B) and the pulse generator (FIGS. 5, 9A and 9B), which together control the sequence of operations performed by units I and II of the illustrated decoding processor, have been represented herein as special-purpose hardware units. It is evident, however, that the decoding process also could be carried out by means of a programmed general-purpose computer equipped with a small associative memory of the kind depicted herein, with the sequence of operations being controlled by stored program instructions that have the same effects as the timing pulses generated by the single shots shown in FIGS. 9A and 9B.

While the invention has been particularly shown and described with reference to a preferred embodiment thereof, it will be understood by those skilled in the art that various changes in form and details may be made therein without departing from the spirit and scope of the invention.

What is claimed is:

1. A method of utilizing a data processor to decode input variable-length code words of the kind which contain variable-length prefixes each uniquely representing a particular code word length, the most frequently occurring input code words having the shortest word lengths and the shortest prefixes, said decoding method comprising the following steps:

a. utilizing the leading N-bit portions of the successive input code words (where N is an integer at least equal to the number of bits in the longest of said prefixes) to address selected locations in a first memory of said data processor, each of said first memory locations being allocated to a particular length-indicating prefix and none other;

b. storing in a second memory of said data processor, at each of a plurality of locations therein which correspond respectively to addressable locations in said first memory, information that pertains to all of the code words containing the particular length-indicating prefix to which the respective first memory location is allocated, such information including a base address assigned to all code words having that same prefix;

c. storing in a third memory of said data processor, at locations therein which are addressable by combinations of predetermined base addresses and selected displacements therefrom, a plurality of fixed-length code words which are the decoded equivalents of at least the most frequently occurring variable-length code words;

d. reading a base address from the location in said second memory which corresponds to that location in said first memory which is addressed by the prefix of the input code word that currently is being decoded;

e. forming from the base address read in step (d) a final address which incorporates a displacement value denoted by the remaining portion of the current input code word; and f. reading from the particular location in said third memory which is designated by said final address a fixed-length code word corresponding the the current input code word.

2. A method of utilizing a data processor to decode input variable-length code words of the kind which contain variable-length prefixes each uniquely representing a particular code word length, the more frequently occurring input code words having the shorter word lengths and the shorter prefixes, the less frequently occurring input code words being of the same length and each having a special prefix common to all such words to which is appended a distinctive fixed-length code word, said decoding method comprising the following steps:

a. utilizing the leading N-bit portions of the successive input code words (where N is an integer at least equal to the number of bits in the longest of said prefixes) to address selected locations in a first memory of said data processor, each of said first memory locations being allocated to a particular length-indicating prefix and none other;

b. storing in a second memory of said data processor, at locations therein which correspond respectively to the addressable locations in said first memory, information pertaining to the various prefixes, such information including, in the case of the less frequently occurring input code words identified by said special prefix, an indication that such a prefix has been detected;

c. storing in a third memory of said data processor the fixed-length code words which are the decoded equivalents of the more frequently occurring variable-length code words;

d. reading the information from that location in said second memory which corresponds to the location in said first memory which currently is being addressed by a variable-length code word prefix; and e. performing one of the following steps according to the type of information read from said second memory:

e1. if a special code indication is absent, then using the base address corresponding to the prefix in conjunction with the remainder of the input code word to form a final address for said third memory, and reading from said third memory the fixed-length code word thus addressed as the decoded output; or e2. if a special code indication is present, then discarding the special prefix and identifying the remainder of the input code word as the decoded output.

3. A method of utilizing a data processor for converting into code words of fixed length a succession of input code words whose respective lengths may vary inversely according to their relative frequency of occurrence, said input code words including prefixes uniquely identifying the respective lengths of their code words, the lengths of the respective prefixes also varying inversely according to their relative frequency of occurrence, whereby the most frequently occurring input code words have the shortest lengths and the shortest prefixes, said method comprising the steps of:

a. storing in a first storage unit of said processor, at every location therein which may be addressed by a prefix of an input code word, information pertaining to all code words of the length denoted by the respective prefix, such information including, at least for those input code words of relatively high frequency, an indication of how many bits remain in each of these code words after the prefix thereof has been excluded and also including a base address assigned to all code words having that prefix;

b. utilizing the prefix of the current input code word as an address for locating and reading out of said first storage unit the information pertaining to that prefix;

c. combining the base address for the current input code word with a displacement value represented by the remainder of that code word (as indicated by the information read out in step (b) to form a final address which is unique to that specific input code word;

d. storing in a second storage unit of said processor, at locations therein which are respectively addressable by the various addresses that may be formed in step (c), fixed-length code words respectively representing the input code words from which said final addresses are derived; and e. reading from said second storage unit the fixed-length code designated by the final address formed in step (c) as the output of said code conversion method.

4. A code conversion method as specified in claim 3 which is operable also upon less frequently occurring input code words of the type wherein a prefix common to all such code words is combined with an individual fixed-length code word, the information stored in step (a) and read out in step (b) including an indication as to whether or not the input code word is of this type, said method including the following step as an alternative to steps (c) and (e):

f. in the case of each input code word that has said common prefix, reading the remainder of said code word exclusive of said prefix as the output of said code conversion method.

5. Apparatus for decoding into fixed-length code words a succession of input code words each represented by serially ordered bits, at least some of said input code words being of a type produced by a variable-length encoding process and respectively having variable-length prefixes, each such prefix being unique to a particular code word length, said apparatus comprising:

a. an argument register;

b. means for entering into said argument register at least that much of the leading portion of an input code word which contains the prefix thereof;

c. an associative memory containing stored code words each corresponding uniquely to a respective length indicating prefix, said associative memory being operable in response to the argument stored in said argument register to generate a match-indicating signal distinctively related to the prefix included in said argument;

d. a storage unit having word-storing locations therein respectively corresponding to said code-length indicating prefixes and respectively addressable by the match-indicating signals which are generated by said associative memory in response to such prefixes, each of said locations storing a word which contains a base address unique to the respective prefix and other information indicating which, if any, of the bit positions in an input code word of that length is occupied by bits exclusive of that prefix;

e. a data register for storing the base address of the word in said storage unit which is designated by the match-indicating signal from said associative memory;

f. means responsive to the other information in said designated word for forming in said data register a new address which is determined in part by said base address and in part by the remainder of the current input code word exclusive of its prefix;

g. a memory having storage locations therein which are addressable in accordance with addresses that may be stored in said data register, each such location storing a fixed-length code word corresponding to the input code word that produced the respective address stored in said data register; and h. means for reading from said memory (g), as the decoded output of said apparatus, the fixed-length code word designated by the address stored in said data register.

6. Apparatus as set forth in claim 5 which is further adapted to decode input code words of a special type in each of which a bit string of fixed length is appended to a length-indicating prefix that is common to all input code words of that type, the information contained in each of the words stored in storage unit (d) including an indication as to whether or not such word is addressable by said common prefix, said apparatus further including:

i. means responsive to an indication that the currently designated word in storage unit (d) is being addressed by said common prefix for causing the fixed-length bit string appended to that prefix to be read out of said apparatus as its decoded output.

7. Apparatus for decoding into code words of fixed length a succession of input code words at least some of which are of variable length, said variable-length code words respectively having variable-length prefixes each uniquely identifying a particular code word length, none of said prefixes constituting the beginning of a longer prefix, and none of said variable-length code words constituting the beginning of a longer code word, said apparatus comprising:

a. an associative memory having rows and columns of bit-storing memory cells, said rows respectively storing the bits of the various prefixes, with the bit in the leading position of each prefix occupying a common registration column, there being at least as many cells in each row as there are bits in the longest prefix, each of said cells being capable of assuming either one of two binary states or else a third state in which its setting is considered to be without binary significance, this third state being assumed by any cell that does not store a prefix bit;

b. an argument register for said associative memory having positions therein for storing the respective bits of an argument, with the position at which the leading bit of the argument is stored corresponding to said registration column, said register having a capacity for storing at least the number of bits contained in the longest prefix;

c. ingating means operable for causing the bits of a bit stream containing the successive input code words to be serially entered into said argument register;

d. shift means operable to shift the bits stored in said argument register progressively through selected numbers of positions in the direction of said leading bit position, with exit from said register being accomplished by any bit when it leaves said leading bit position;

e. a readable storage unit controlled by the output of said associative memory, said storage unit containing rows of bit-storage cells, each such row of cells being allocated to a corresponding row of cells in said associative memory and containing cells which store a representation of the respective prefix length, other cells which store a representation indicating the number of remaining bits in any code word of the length denoted by said prefix, and still other cells storing a representation of a base address assigned to code words of that length;

f. means for operating said associative memory to find a match between the prefix currently stored in the leading portion of said argument register and the prefixes stored in the respective rows of said associative memory;

g. means for reading out of said storage unit the items of information stored in the row of cells which corresponds to the matching prefix found by said associative memory;

h. data registers for respectively storing the prefix length, remainder length and base address read out of said storage unit during each such association;

i. means responsive to the setting of said prefix length register to operate said shift means (d) and ingating means (c) for shifting out of said argument register the prefix bits of the current input code word and for entering an equal number of bits into said argument register;

j. means responsive to the setting of said remainder length register to operate said shifting means (d) and ingating means (c) for shifting out of said argument register the remaining bits, if any, of the current input code word and entering an equal number of bits into said argument register;

k. address forming means operable to form a final address which is determined in part by the initial setting of said base address register and in part by the remainder, if any, which is read out of said argument register by means (j); and l. a decoded word store addressable by the final address formed by means (k) to furnish a fixed-length code word equivalent to the input code word from which said final address was derived.

8. Apparatus as specified in claim 7 which is further adapted to decode input code words of the type in which a fixed-length code word is appended to a prefix that is common to all code words of that type, said storage unit (e) including, in the row of cells corresponding to said common prefix, a stored indication identifying the current argument prefix as the common prefix; said apparatus further including:

m. means responsive to the readout of said stored indication by means g for preventing the operations of means (k) and means (l) and for operating said shifting means (d) to read out of said argument register, as the output of said apparatus, the remaining bits of the current input code word following said common prefix.

* * * * *